(12) United States Patent
Matsuo

(10) Patent No.: US 12,128,754 B2
(45) Date of Patent: Oct. 29, 2024

(54) VEHICLE

(71) Applicant: HONDA MOTOR CO., LTD., Tokyo (JP)

(72) Inventor: Yuhei Matsuo, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 304 days.

(21) Appl. No.: 17/894,555

(22) Filed: Aug. 24, 2022

(65) Prior Publication Data

US 2023/0067748 A1  Mar. 2, 2023

(30) Foreign Application Priority Data

Aug. 27, 2021  (JP) ................................ 2021-139388

(51) Int. Cl.
*B60K 1/04*  (2019.01)
*B60L 50/60*  (2019.01)
*B60L 50/64*  (2019.01)

(52) U.S. Cl.
CPC ................ *B60K 1/04* (2013.01); *B60L 50/64* (2019.02); *B60L 50/66* (2019.02); *B60K 2001/0422* (2013.01); *B60K 2001/0438* (2013.01)

(58) Field of Classification Search
CPC .............. B60K 1/04; B60K 2001/0422; B60K 2001/0438; B60L 50/64; B60L 50/66

USPC ........................................................ 180/68.5
See application file for complete search history.

(56) References Cited

U.S. PATENT DOCUMENTS

| 2018/0219407 A1 | 8/2018 | Nakamura |
| 2019/0366824 A1 | 12/2019 | Wakebe |
| 2021/0122244 A1 | 4/2021 | Nakamura |

FOREIGN PATENT DOCUMENTS

| JP | 2018-125956 A | 8/2018 |
| JP | 2019-209718 A | 12/2019 |

*Primary Examiner* — Hau V Phan
(74) *Attorney, Agent, or Firm* — Paratus Law Group, PLLC

(57) ABSTRACT

A vehicle includes: a rotating electrical machine configured to drive the vehicle; a high-voltage power source configured to supply electricity for driving the rotating electrical machine; main and backup low-voltage power sources; a normal load configured to operate on the electricity supplied from the main low-voltage power source; a critical load configured to operate on the electricity supplied from the backup low-voltage power source; and a floor panel. The critical load includes an auxiliary load for controlling, braking, steering, or acquiring external information of the vehicle. A central tunnel extending in a central part of the vehicle in the vehicle width direction along the vehicle length direction is formed in the floor panel. The low-voltage power sources are placed right above the floor panel. One of them is placed to one side of the central tunnel in the vehicle width direction, and the other one the other side.

11 Claims, 12 Drawing Sheets

VEHICLE

CROSS-REFERENCE TO RELATED APPLICATION

This application is based on and claims priority under 35 USC § 119 from Japanese Patent Application No. 2021-139388, filed on Aug. 27, 2021, the entire contents of which are incorporated herein by reference.

TECHNICAL FIELD

The present disclosure relates to a vehicle, especially equipped with a power supply.

BACKGROUND

In recent years, there is a need to improve traffic safety in order to make cities and streets inclusive, safe, resilient, and sustainable. From a viewpoint of improving the traffic safety, vehicles are required to ensure the traffic safety, for example, even when abnormality occurs in the vehicles.

JP2019-209718A, for example, discloses a vehicle in which an auxiliary battery is placed in a passenger compartment and has a battery fixing structure to protect the battery from an impact of a side collision. The vehicle reduces a risk that damage to the battery from a side collision may cause a power outage and traffic safety may not be ensured.

JP2018-125956A, for example, discloses a vehicle including: a first power supply line including a first battery and a first load; and a second power supply line including a second battery and a second load. The first battery supplies electricity to the first load, and the second battery the second load. The first and the second loads have similar functionality to support each other. Even if electricity supplied from the first/the second battery is cut off and the first/the second load stops, the functionality of the first/the second load can be maintained using the second/the first load to ensure traffic safety.

However, JP2019-209718A is silent on a risk that flood damage to the battery may cause a power outage when a lower part of the vehicle is flooded due to a disaster or an accident. Further, JP2018-125956A does not specify where the first and the second batteries are placed and is silent on a risk that flood damage to both the first and the second batteries may cause a power outage when a lower part of the vehicle is flooded due to a disaster or an accident.

The present invention provides a vehicle that can reduce a risk of a power outage even if a lower part of the vehicle is flooded due to a disaster or an accident.

SUMMARY

A vehicle of an aspect of the present disclosure includes: a rotating electrical machine configured to drive the vehicle; a high-voltage power source configured to supply electricity for driving the rotating electrical machine; a main low-voltage power source configured to supply electricity whose output voltage is lower than an output voltage of the high-voltage power source; a normal load configured to operate on the electricity supplied from the main low-voltage power source; a backup low-voltage power source configured to supply electricity whose output voltage is lower than that of the high-voltage power source; a critical load configured to operate on the electricity supplied from the backup low-voltage power source; and a floor panel that extends in a vehicle length direction and a vehicle width direction and is configured to constitute a lower part of a vehicle body at least in part. The critical load includes: an auxiliary load for controlling the vehicle; an auxiliary load for braking the vehicle; an auxiliary load for steering the vehicle; or an auxiliary load for acquiring external information of the vehicle. A central tunnel that is convex upward and extends in a central part of the vehicle in the vehicle width direction along the vehicle length direction is formed in the floor panel. One of the main and the backup low-voltage power sources is placed right above the floor panel and to one side of the central tunnel in the vehicle width direction, and the other one of the main and the backup low-voltage power sources is placed right above the floor panel and to the other side of the central tunnel in the vehicle width direction.

A vehicle of another aspect of the present disclosure includes: a rotating electrical machine (MG) configured to drive the vehicle; a high-voltage power source configured to supply electricity for driving the rotating electrical machine; a main low-voltage power source configured to supply electricity whose output voltage is lower than an output voltage of the high-voltage power source; a normal load configured to operate on the electricity supplied from the main low-voltage power source; a backup low-voltage power source configured to supply electricity whose output voltage is lower than that of the high-voltage power source; a critical load configured to operate on the electricity supplied from the backup low-voltage power source; and a floor panel that extends in a vehicle length direction and a vehicle width direction and is configured to constitute a lower part of a vehicle body at least in part. The critical load includes: an auxiliary load for controlling the vehicle; an auxiliary load for braking the vehicle; an auxiliary load for steering the vehicle; or an auxiliary load for acquiring external information of the vehicle. The floor panel includes: a front floor panel that extends in the vehicle length and the vehicle width directions and is configured to constitute a floor of a passenger compartment; and a rear floor panel that extends in the vehicle length and the vehicle width directions behind and above the front floor panel and is configured to constitute a floor of a luggage compartment provided behind the passenger compartment. One of the main and the backup low-voltage power sources is placed right above the front floor panel, and the other one of the main and the backup low-voltage power sources is placed right above the rear floor panel.

A vehicle of another aspect of the present disclosure includes: a rotating electrical machine configured to drive the vehicle; a high-voltage power source configured to supply electricity for driving the rotating electrical machine; a main low-voltage power source configured to supply electricity whose output voltage is lower than an output voltage of the high-voltage power source; a normal load configured to operate on the electricity supplied from the main low-voltage power source; a backup low-voltage power source configured to supply electricity whose output voltage is lower than that of the high-voltage power source; a critical load configured to operate on the electricity supplied from the backup low-voltage power source; and a floor panel that extends in a vehicle length direction and a vehicle width direction and is configured to constitute a lower part of a vehicle body at least in part. The critical load includes: an auxiliary load for controlling the vehicle; an auxiliary load for braking the vehicle; an auxiliary load for steering the vehicle; or an auxiliary load for acquiring external information of the vehicle. The floor panel includes: a front floor panel that extends in the vehicle length and the vehicle width directions and is configured to constitute a floor of a passenger compartment; and a rear floor panel that extends in the vehicle length and the vehicle width directions behind and above the front floor panel and is configured to constitute a floor of a luggage compartment provided behind the passenger compartment. One of the main and the backup low-voltage power sources is placed right above the rear floor panel and to one side of a center of the vehicle in the vehicle width direction, and the other one of the main and the backup low-voltage power sources is placed right above the rear floor panel and to the other side of the center of the vehicle in the vehicle width direction. The main and the backup low-voltage power sources are separated from each other by the center of the vehicle in the vehicle width direction such that an offset distance in the vehicle width direction between the center of the vehicle and the main low-voltage power source is equal to an offset distance in the vehicle width direction between the center of the vehicle and the backup low-voltage power source.

According to the present disclosure, even if a lower part of a vehicle is flooded due to a disaster or an accident, a risk of a power outage can be reduced.

BRIEF DESCRIPTION OF DRAWINGS

Exemplary embodiments of the present disclosure will be described in detail based on the following figures, wherein.

DESCRIPTION OF EMBODIMENTS

Figure 1:
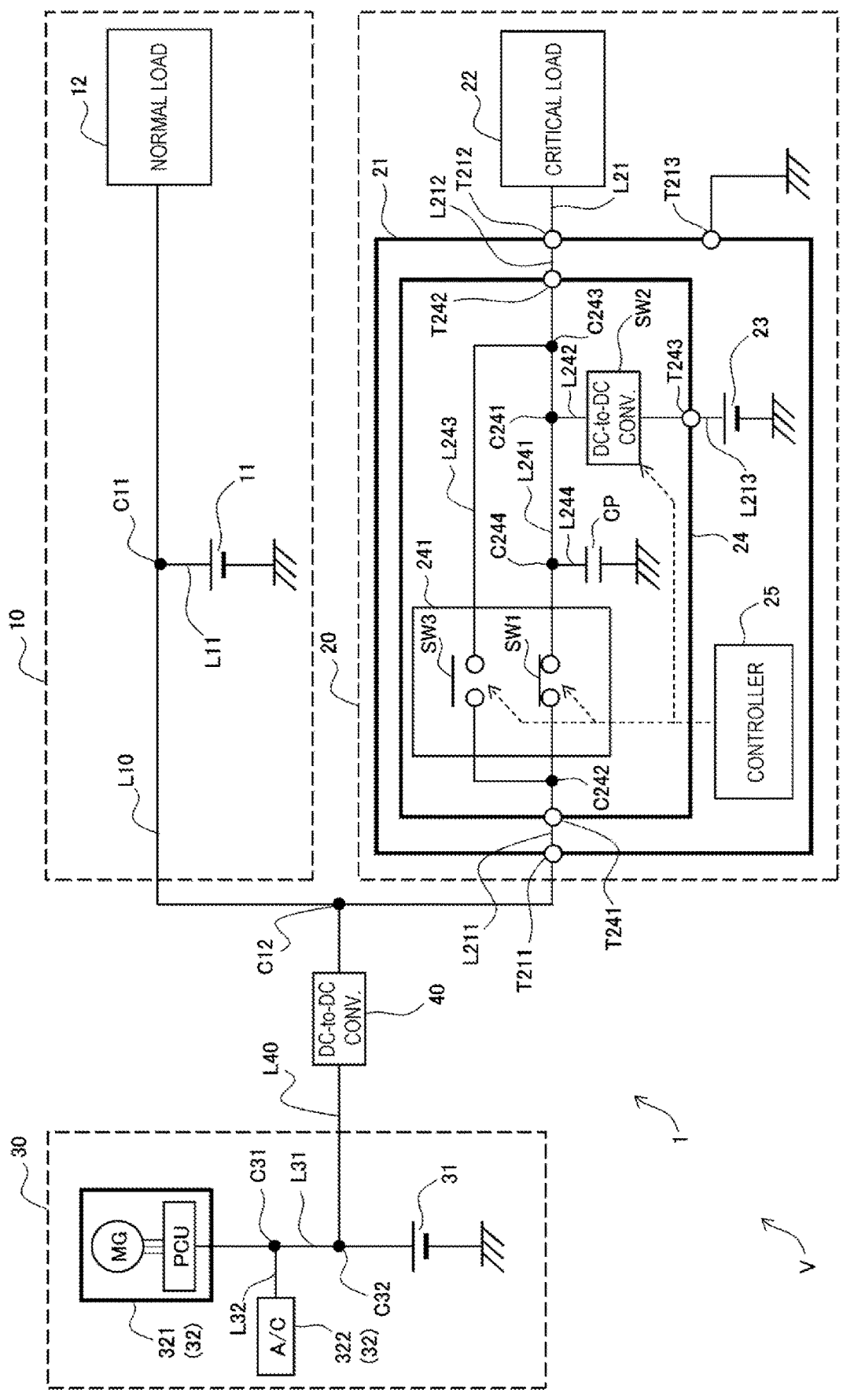
FIG. 1 is a schematic diagram of a power supply system mounted on a vehicle.

In the following, embodiments of a vehicle according to the present disclosure will be described with reference to the drawings. In the drawings, "Fr" denotes the front direction, "Rr" the rear direction. "U" the up direction, "D" the down direction, "L" the left direction, and "R" the right direction. The front-rear direction will be referred to as a "vehicle length direction," the up-down direction as a "vehicle height direction," and the left-right direction as a "vehicle width direction."

Power Supply System

As shown in FIG. 1, a power supply system 1 is mounted on a vehicle V according to the present embodiment. The power supply system 1 includes: a main power supply system 10; a backup power supply system 20; a high-voltage power supply system 30; and a step-down converter 40. The backup power supply system 20 is connected to the main power supply system 10. The high-voltage power supply system 30 is connected to the main power supply system 10 and the backup power supply system 20 via the step-down converter 40. The step-down converter 40 is configured to step down an output voltage of the high-voltage power supply system 30. The step-down converter 40 is, for example, a DC-to-DC converter.

Main Power Supply System

The main power supply system 10 includes, a main low-voltage power source 11; and a normal load 12.

The main low-voltage power source 11 is, for example, a rechargeable battery such as a lead-acid battery. The main low-voltage power source 11 is configured to output, for example, 12 V.

The main low-voltage power source 11 is provided on a line L11. One end of the line L11 is connected to a contact C11 provided on a line L10, and the other end of the line L11 is connected to a ground from which voltages in the power supply system 1 are measured. An anode of the main low-voltage power source 11 is connected to the contact C11 via the line L11, and a cathode of the main low-voltage power source 11 is connected to the ground via the line L11.

The normal load 12 includes a load having functionality related to traveling operation, stopping operation, or driving control of the vehicle V. For example, the normal load 12 may include: an auxiliary load for controlling the vehicle V, such as an electronic control unit (EC U); an auxiliary load for braking the vehicle V, such as an automatic brake; an auxiliary load for steering the vehicle V, such as an automatic steering; an auxiliary load for acquiring external information of the vehicle V, such as light detection and ranging (LiDAR); a wiper; a power window; or a meter.

The normal load 12 is connected to one end of the line L10.

Backup Power Supply System

The backup power supply system 20 includes: a backup power source unit 21; and a critical load 22.

The backup power source unit 21 includes: a backup low-voltage power source 23; a switcher 24; and a controller 25 configured to control the switcher 24.

The backup power source unit 21 further includes: a first external terminal T211; a second external terminal T212; and a ground terminal T213. The first external terminal T211 is connected to the other end of the line L10. The ground terminal T213 is connected to the ground.

The critical load 22 includes a load having functionality related to traveling operation, stopping operation, or the driving control of the vehicle V. The critical load 22 has functionality related to execution of minimal risk maneuvers (MRM), which are bare traveling operation, bare stopping operation, and bare driving control for moving the vehicle V to a shoulder of a road to stop safely when driving force from a driving source is lost. For example, the critical load 22 includes: an auxiliary load for controlling the vehicle V, such as an ECU; an auxiliary load for braking the vehicle V, such as an automatic brake; an auxiliary load for steering the vehicle V, such as an automatic steering; or an auxiliary load for acquiring external information of the vehicle V, such as LiDAR The functionality of the critical load 22 of the backup power supply system 20 may overlap with that of the normal load 12 of the main power supply system 10. For example, the critical load 22 may include a load that the normal load 12 also includes to gain redundancy. In other words, functionality common to the normal load 12 and the critical load 22 is performable using the main power supply system 10 or the backup power supply system 20. As a result, the functionality common to the normal load 12 and the critical load 22 can be performed even if abnormality occurred in the main power supply system 10 or the backup power supply system 20.

The critical load 22 is connected to the second external terminal T212 of the backup power source unit 21 by a line L21.

The switcher 24 includes; a first terminal T241; a second terminal T242; and a third terminal T243. The first terminal T241 is connected to the first external terminal T211 of the backup power source unit 21 by a line L211. The second terminal T242 is connected to the second external terminal T212 of the backup power source unit 21 by a line L212.

The switcher 24 further includes a line L241 connecting the first terminal T241 and the second terminal T242. The line L241 is provided with a first switch SW1. In the present embodiment, the first switch SW1 includes a normally-open (NO) switch contact. In this regard, the first switch SW1 remains to be off to disconnect the line L241 when no operation signal is applied to the first switch SW1. Specifically, if the first switch SW1 is an electrically-actuated switch or an electrically-actuated contactor, the first switch SW1 remains to be off to disconnect the line L241 when no electromagnetic force triggered by an operation current is applied to the first switch SW1. The first switch SW1 may be a power semiconductor switch.

The switcher 24 further includes a line L242 connecting the line L241 and the third terminal T243. One end of the line L242 is connected to a contact C241 provided between the first switch SW1 and the second terminal T242 on the line L241, and the other end of the line L242 is connected to the third terminal T243. The line L242 is provided with a second switch SW2. In the present embodiment, the second switch SW2 is a DC-to-DC converter. The second switch SW2 connects the line L242 when the second switch SW2 is on and disconnects the line L242 when the second switch SW2 is off. Since the second switch SW2 is the DC-to-DC converter, a voltage of the line L242 can be stepped up or down when the second switch SW2 is on. Thus, the second switch SW2 can connect or disconnect the line L242 and, when the second switch SW2 is on, can step up or down the voltage of the line L242.

The switcher 24 further includes a line L243 connected in parallel with the line L241. One end of the line L243 is connected to a contact C242 provided between the first terminal T241 and the first switch SW1 on the line L241, and the other end of the connection line L243 is connected to a contact C243 provided between the contact C241 and the second terminal T242 on the line L241. The line L243 is provided with a third switch SW3. In the present embodiment, the third switch SW3 includes a normally-closed (NC) switch contact. In this regard, the third switch SW3 remains to be on to connect the line L243 when no operation signal is applied to the third switch SW3. Specifically, if the third switch SW3 is an electrically-actuated switch or an electrically-actuated contactor, the third switch SW3 remains to be on to connect the connection line L243 when no electromagnetic force triggered by an operation current is applied to the third switch SW3. The third switch SW3 may be a power semiconductor switch.

In this manner, the first switch SW1, which includes the NO switch contact, and the third switch SW3, which includes the NC switch contact, are connected in parallel in the backup power supply system 20.

When the first switch SW1 or the third switch SW3 is on, the backup power supply system 20 is connected to the main power supply system 10. In this case, electricity from the backup low-voltage power source 23 can be supplied to the main power supply system 10, and electricity from the main power supply system 10 can be supplied to the critical load 22. On the other hand, when both the first switch SW1 and the third switch SW3 are off, the backup power supply system 20 is disconnected from the main power supply system 10.

Therefore, even when no electricity is supplied to the controller 25, the critical load 22 can be supplied with electricity from the main power supply system 10.

In the present embodiment, the first switch SW1 and the third switch SW3 are modularized as a switch module 241.

The switcher 24 further includes a line L244 connecting the line L241 and the ground. One end of the line L244 is connected to a contact C244 provided between the first switch SW1 and the contact C241 on the line L241, and the other end of the line L244 is connected to the ground. The line L244 is provided with a capacitor CP.

The backup low-voltage power source 23 is, for example, a rechargeable battery such as a lithium-ion battery. The backup low-voltage power source 23 is configured to output, for example, 12 V.

The backup low-voltage power source 23 is provided on a line L213. One end of the line L213 is connected to the third terminal T243 of the switcher 24, and the other end of the line L213 is connected to the ground. An anode of the backup low-voltage power source 23 is connected to the third terminal T243 of the switcher 24, and a cathode of the backup low-voltage power source 23 is connected to the ground.

Therefore, the second switch SW2, which is a DC-DC converter, is provided between the backup low-voltage power source 23 and the critical load 22. When the second switch SW2 is on, the backup low-voltage power source 23 supplies electricity to the backup power supply system 20, which includes the critical load 22, through the line L213 and the line L242 of the switcher 24. Since the second switch SW2 is the DC-to-DC converter, electricity from the backup low-voltage power source 23 is supplied to the backup power supply system 20, which includes the critical load 22, through step-up or step-down conversion by the second switch SW2 to a desired voltage. In this manner, the output voltage of the backup low-voltage power source 23 can be converted into the desired voltage, and the electricity can be supplied to the backup power supply system 20, which includes the critical load 22. On the other hand, when the second switch SW2 is off, the line L242 of the switcher 24 is disconnected and thus the electricity from the backup low-voltage power source 23 is not supplied to the backup power supply system 20.

The controller 25 includes processing circuitry, such as a central processing unit (CPU). The controller 25 further includes a read-only memory (ROM) and is configured to control the first switch SW1, the second switch SW2, and the third switch SW3 using software stored in the ROM. Specifically, the controller 25 is configured to turn the first switch SW1, the second switch SW2, and the third switch SW3 each on or off. The controller 25 is connected to the first switch SW1, the second switch SW2, and the third switch SW3 by signal lines. The controller 25 is configured to transmit operation signals to the first switch SW1, the second switch SW2, and the third switch SW3 through the signal lines. The operation signals include signals for turning on or off the first switch SW1, the second switch SW2, or the third switch SW3.

High-Voltage Power Supply System

The high-voltage power supply system 30 includes: a high-voltage power source 31; and a high-voltage load 32.

The high-voltage power source 31 is, for example, a rechargeable battery such as a lithium-ion battery. The high-voltage power source 31 is configured to output a higher voltage than the main low-voltage power source 11 outputs and than the backup low-voltage power source 23 outputs. The high-voltage power source 31 is configured to output, for example, 200 V.

The high-voltage power source 31 is connected to a line L31. One end of the line L31 is connected to the ground. A cathode of the high-voltage power source 31 is connected to the ground via the line L31.

An operating voltage of the high-voltage load 32 is higher than operating voltages of the normal load 12 and the critical load 22 are. In the present embodiment, the high-voltage load 32 includes: a driver 321 configured to drive the vehicle V; and an air conditioner 322 configured to regulate a temperature inside a passenger compartment CB of the vehicle V.

The driver 321 includes: a rotating electrical machine MG configured to generate force for driving the vehicle V; and a power control unit PCU configured to control the rotating electrical machine MG. The power control unit PCU includes: a DC-to-DC converter; and an inverter.

The driver 321 is connected to the other end of the line L31 and can be provided with electricity from the high-voltage power source 31. The driver 321 is configured to convert direct current (DC) supplied from the high-voltage power source 31 into three-phase alternating current (3φ AC) using the power control unit PCU to supply the 3φ AC to the rotating electrical machine MG. As a result, the rotating electrical machine MG can generate the force for driving the vehicle V. The driver 321 may be configured to charge the high-voltage power source 31 by generating 3φ AC by regenerative braking of the vehicle V using the rotating electrical machine MG and converting the 3φ AC into DC by the power control unit PCU.

The air conditioner 322 is connected to a contact C31 provided between the high-voltage power source 31 on the line L31 and the driver 321 via a line L32. The air conditioner 322 is configured to operate on electricity supplied from the high-voltage power source 31.

Step-Down Converter

The step-down converter 40 is provided on a line L40. One end of the line L40 is connected to a contact C32 provided between the high-voltage power source 31 and the contact C31 on the line L31, and the other end of the line L40 is connected to a contact C12 provided between the contact CI 1 on the line L10 and the other end of the connection L10 (that is, the first external terminal T211 of the backup power source unit 21 of the backup power supply system 20).

In this manner, the high-voltage power supply system 30 is connected to the main power supply system 10 and the backup power supply system 20 via the step-down converter 40.

The step-down converter 40 is configured to step down an output voltage of the high-voltage power supply system 30. The step-down converter 40 is, for example, a DC-to-DC converter. Therefore, electricity from the high-voltage power supply system 30 can be supplied to the main power supply system 10 and the backup power supply system 20 through step-down conversion by the step-down converter 40. In other words, electricity from the high-voltage power source 31 can be supplied to the main power supply system 10 and the backup power supply system 20 through the step-down conversion by the step-down converter 40.

Operation of Vehicle Power Supply System

Next, operation when the vehicle power supply system 1 is on will be described.

Operation of Vehicle Power Supply System when Vehicle Power Supply System is on and Main Power Supply System has No Abnormality When the vehicle power supply system 1 is on and the main power supply system 10 has no abnormality, the controller 25 of the backup power supply system 20 controls the switches such that the NO first switch SW1 is on, the second switch SW2 is off, and the NC third switch SW3 is off.

"When the vehicle power supply system 1 is on" refers to a state in which the driving source of the vehicle V is in operation and auxiliary machinery for traveling is supplied with electricity necessary for driving the vehicle V, for example, when the vehicle V is traveling or can start to travel immediately. In the present embodiment, it refers to a state in which a power switch of the vehicle V is on and the driver 321, the normal load 12, and the critical load 22 are in operation. If the vehicle V includes an internal combustion engine, it may refer to a state in which ignition of the vehicle V is on and the internal combustion engine, the normal load 12, and the critical load 22 are in operation.

Therefore, when the vehicle power supply system 1 is on and the main power supply system 10 has no abnormality, the first switch SW1 is on and the second switch SW2 and the third switch SW3 are off. In other words, the backup low-voltage power source 23 is disconnected by the second switch SW2, and no electricity is supplied from the backup low-voltage power source 23. On the other hand, since the first switch SW1 is on, the main power supply system 10 and the backup power supply system 20 are connected. In other words, the electricity from the main low-voltage power source 11 is supplied to the critical load 22 through the lines L10 and L241.

Operation of Vehicle Power Supply System when Vehicle Power Supply System is on and Abnormality Occurred in Main Power Supply System When the vehicle power supply system 1 is on and the controller 25 of the backup power supply system 20 detects abnormality in the main power supply system 10, the first switch SW1 is turned off, the second switch SW2 is turned on, and the third switch SW3 is turned off.

For example, when a voltmeter configured to measure an output voltage of the main low-voltage power source 11 is connected to the controller 25 and the voltage measured by the voltmeter has fallen below a predetermined lower limit, the controller 25 determines that abnormality occurred in the main power supply system 10.

In this manner, when the vehicle power supply system 1 is on and abnormality occurred in the main power supply system 10, both the first switch SW1 and the third switch are turned off to disconnect the main power supply system 10 from the backup power supply system 20. Since the second switch SW2, however, is turned on, electricity from the backup low-voltage power source 23 is supplied to the backup power supply system 20 through the line L213 and the line L242 of the switcher 24. The output voltage of the backup low-voltage power supply 23 is stepped up or down to a desired voltage by the second switch SW2, and the electricity from the backup low-voltage power source 23 is then supplied to the critical load 22 through the lines L241, the L212, and L21.

Therefore, when the vehicle power supply system 1 is on and even abnormality occurred in the main power supply system 10, the critical load 22 can operate to execute MRM.

In addition, when the vehicle power supply system is on and abnormality occurred in the main power supply system 10, the backup power supply system 20 is disconnected from the main power supply system 10, and thus the electricity from the backup low-voltage power source 23 is not supplied to the normal load 12. Therefore, the critical load 22 can operate while consumption of the electricity supplied from the backup low-voltage power source 23 is hold down.

Since the first switch SW1 and the third switch SW3 are power semiconductor switches and the second switch SW2 is a DC-to-DC converter in the present embodiment, a switching time of the second switch SW2 is longer than switching times of the first switch SW1 and the third switch SW3. Since the switcher 24 includes the capacitor CP as described above in the present embodiment, electricity stored in the capacitor CP is discharged until turn-on switching of the second switch SW2 is completed after turn-off switching of the first switch SW1 is completed. Therefore, the critical load 22 can be supplied with electricity even from completion of the turn-off switching of the first switch SW1 until completion of the turn-on switching of the second switch SW2.

As described above, the normal load 12 includes: an auxiliary load for controlling the vehicle V, such as an ECU; an auxiliary load for braking the vehicle V, such as an automatic brake; an auxiliary load for the steering the vehicle V, such as an automatic steering; or an auxiliary load for acquiring external information of the vehicle V, such as LiDAR. The critical load 22 has a functionality related to execution of MRM and includes: an auxiliary load for controlling the vehicle V, such as an ECU; an auxiliary load for braking the vehicle V, such as an automatic brake; an auxiliary load for steering the vehicle V, such as an automatic steering device; or an auxiliary load for acquiring external information of the vehicle V, such as LiDAR. Therefore, the MRM can be executed, even if power supply from the main low-voltage power source 11/the backup low-voltage power source 23 is cut off, using the normal load 12 or the critical load 22 operable on electricity supplied from the backup low-voltage power source 23/the main low-voltage power source 11.

Structure of Vehicle Body

Figure 2:
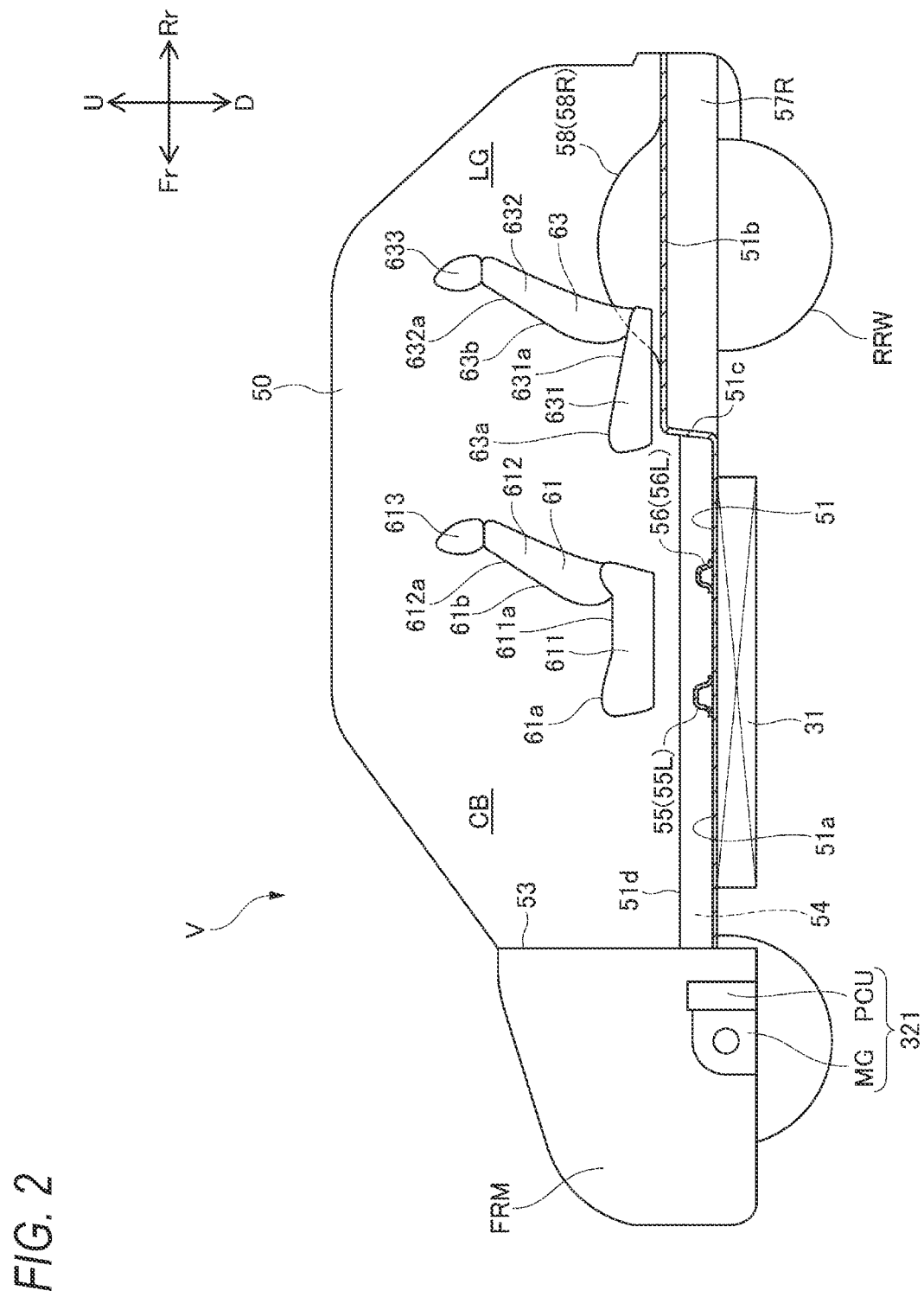
FIG. 2 is a side view of a main part of the vehicle as viewed from a left side.
Figure 3:
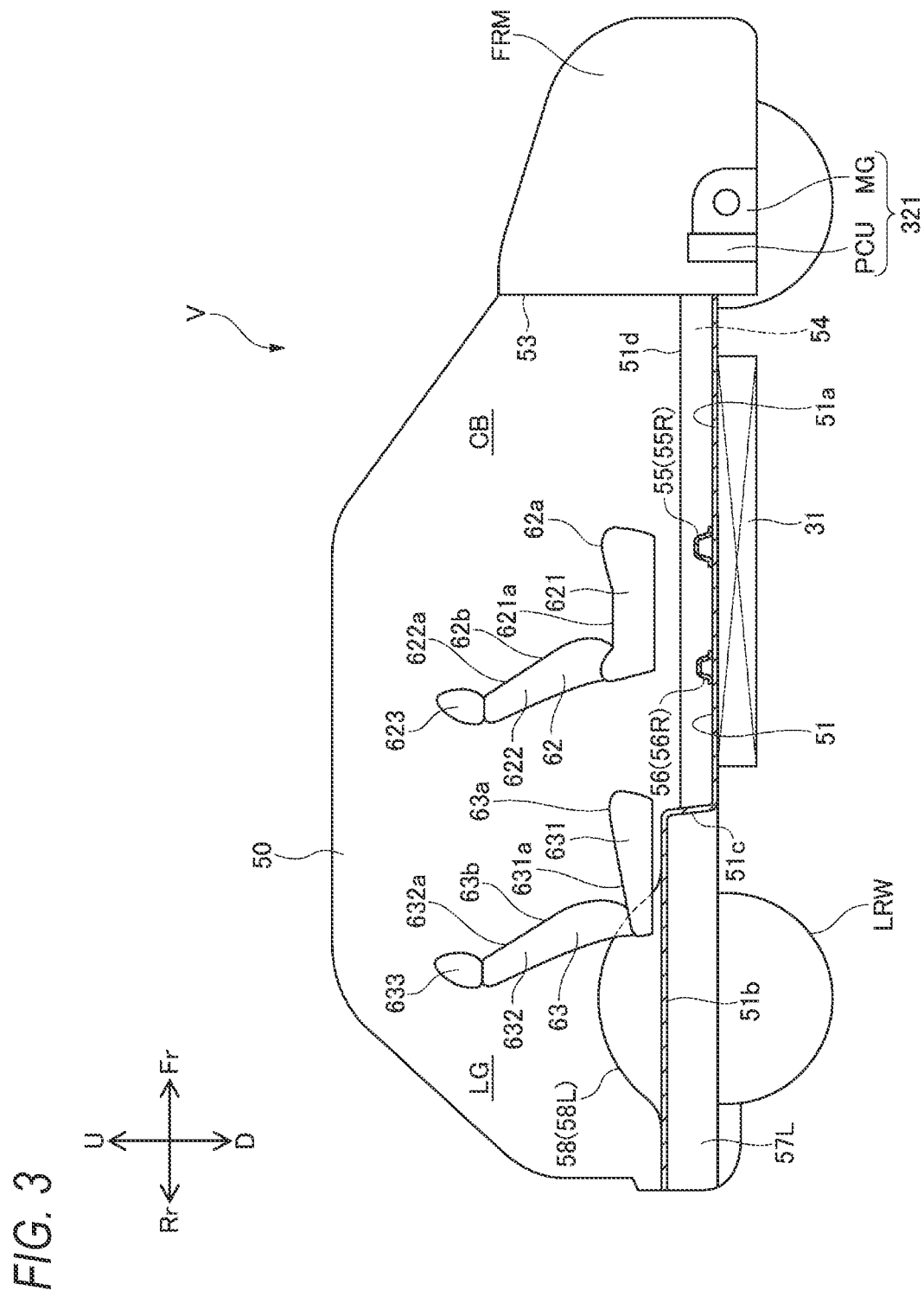
FIG. 3 is a side view of the main part of the vehicle as viewed from a right side.
Figure 4:
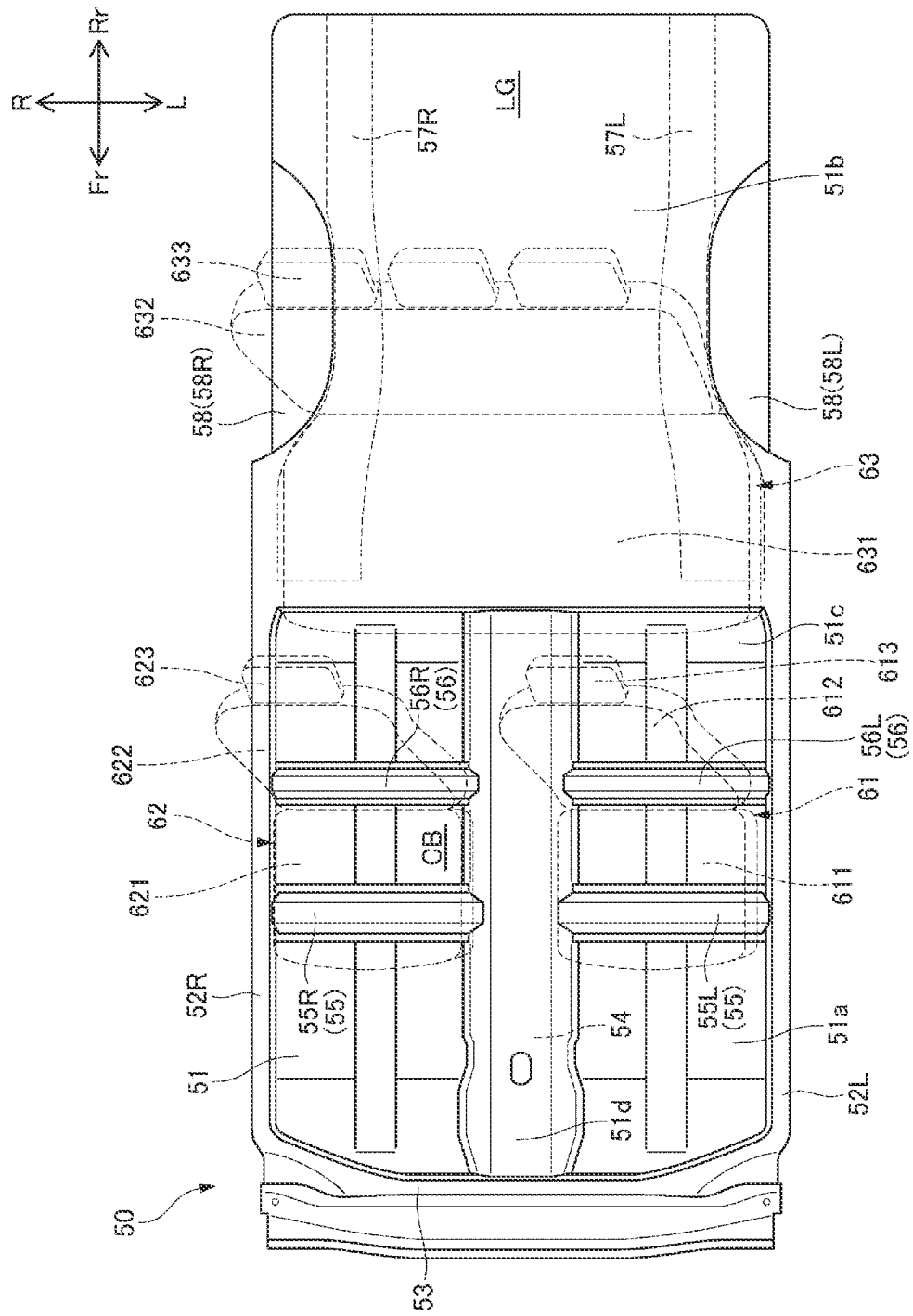
FIG. 4 is a top view of a lower part of a vehicle body of the vehicle shown in FIGS. 2 and 3.

As shown in FIGS. 2 to 4, the vehicle V includes, for example, a monocoque vehicle body 50.

The vehicle body 50 includes: a floor panel 51 configured to constitute a lower part of the vehicle body 50 at least in part; and a pair of a left sill 52L and a right sill 52R extending in a vehicle length direction along left and right ends of the passenger compartment CB.

The floor panel 51 includes: a front floor panel 51*a* that extends in the vehicle length direction and a vehicle width direction and that is configured to constitute a floor of the passenger compartment CB; and a rear floor panel 51*b* that extends in the vehicle length and the vehicle width directions, that is placed behind and above the front floor panel 51*a*, and that is configured to constitute a floor or the like of a luggage compartment LG provided behind the passenger compartment CB.

A left end part of the front floor panel 51*a* is connected to the left sill 52L, and a right end part of the front floor panel 51*a* is connected to the right sill 52R. In this manner, the front floor panel 51*a* is fixed to the left sill 52L and the right sill 52R.

In the vehicle V, the passenger compartment CB and a front compartment FRM that is placed in front of the passenger compartment CB are separated by a dashboard 53 extending upward from a front end part of the front floor panel 51*a*.

A kick-up 51*c* extending upward is formed at a rear end of the front floor panel 51*a*. An upper end of the kick-up 51*c* is connected to a front end of the rear floor panel 51*b*. A central tunnel 51*d* is formed along the vehicle length direction in the central part of the front floor panel 51*a* in the vehicle width direction. The central tunnel 51*d* is bent such that the front floor panel 51*a* is convex upward and bridges the front floor panel 51*a* in the vehicle length direction between the dash panel 53 and the kick-up 51*c*. Below the central tunnel 51*d*, a tunnel space 54 having a substantially trapezoidal shape as viewed from the vehicle length direction extends in the vehicle length direction.

The front floor panel 51*a* is provided with a front floor beam 55 and a rear floor beam 56 that extend in the vehicle width direction.

The front floor beam 55 includes: a left front floor beam 55L bridging the front floor panel 51*a* in the vehicle width direction between the central tunnel 51*d* and the left sill 52L; and a right front floor beam 55R bridging the front floor panel 51*a* in the vehicle width direction between the central tunnel 51*d* and the right sill 52R. As viewed from a vehicle height direction, the left front floor beam 55L and the right front floor beam 55R are on a straight line extending in the vehicle width direction. As viewed from the vehicle width direction, the left front floor beam 55L and the right front floor beam 55R each have an inverted U-shape and each include: a substantially flat upper surface; a front surface bent downward from a front end of the upper surface; and a rear surface bent downward from a rear end of the upper surface. A lower end of the left front floor beam 55L is joined to the front floor panel 51*a*, a right end of the left front floor beam 55L is joined to the central tunnel 51*d*, and a left end of the left front floor beam 55L is joined to the left sill 52L. A lower end of the right front floor beam 55R is joined to the front floor panel 51*a*, a left end of the right front floor beam 55R is joined to the central tunnel 51*d*, and a right end of the right front floor beam 55R joined to the right sill 52R. Therefore, the front floor panel 51*a* is reinforced with the front floor beam 55. In particular, the front floor beam 55 increases rigidity of the front floor panel 51*a* in the vehicle width direction.

The rear floor beam 56 includes: a left rear floor beam 56L that is behind the left front floor beam 55L and bridges the front floor panel 51*a* in the vehicle width direction between the central tunnel 51*d* and the left sill 52L; and a right rear floor beam 56R that is behind the right front floor beam 55R and bridges the front floor panel 51*a* in the vehicle width direction between the central tunnel 51*d* and the right sill 52R. As viewed from the vehicle height direction, the left rear floor beam 56L and the right rear floor beam 56R are on a straight line extending in the vehicle width direction. As viewed from the vehicle width direction, the left rear floor beam 56L and the right rear floor beam 56R each have an inverted U-shape and each include: a substantially flat upper surface; a front surface bent downward from a front end of the upper surface; and a rear surface bent downward from a rear end of the upper surface. A lower end of the left rear floor beam 56L is joined to the front floor panel 51a, a right end of the left rear floor beam 56L is joined to the central tunnel 51d, and a left end of the left rear floor beam 56L is joined to the left sill 52L. A lower end of the right rear floor beam 56R is joined to the front floor panel 51a, a left end of the right rear floor beam 56R is joined to the central tunnel 51d, and a right end of the right rear floor beam 56R is joined to the right sill 52R. Therefore, the front floor panel 51a is reinforced with the rear floor beam 56. In particular, the rear floor beam 56 increases rigidity of the front floor panel 51a in the vehicle width direction.

The vehicle body 50 further includes: a left rear frame 57L whose front end is joined to a rear end part of the left sill 52L and that extends rearward from the rear end part of the left sill 52L; and a right rear frame 57R whose front end is joined to a rear end part of the right sill 52R and that extends rearward from the rear end part of the right sill 52R. A left end part of the rear floor panel 51b is connected to the left rear frame 57L, and a right end part of the rear floor panel 51b is connected to the right rear frame 57R. In this manner, the rear floor panel 51b is fixed to the left rear frame 57L and the right rear frame 57R. The rear floor panel 51b may protrude outward in the vehicle width direction from the left rear frame 57L or the right rear frame 57R.

Each end of the rear floor panel 51b in the vehicle width direction is provided with a rear wheel well 58. The rear wheel wells 58 includes: a left rear wheel well 58L provided at a left end of the rear floor panel 51b; and a right rear wheel well 58R provided at a right end of the rear floor panel 51b. The left rear wheel well 58L is supported on the left rear frame 57L and extends upward from an outer end of the left rear frame 57L in the vehicle width direction. An upper end of the left rear wheel well 58L is bent outward in the vehicle width direction. The left rear wheel well 58L is configured to house a left rear wheel LRW. The left rear wheel well 58L is configured to support an upper end part of a damper configured to support the left rear wheel LRW. The right rear wheel well 58R is supported on the right rear frame 57R and extends upward from an outer end of the right rear frame 57R in the vehicle width direction. An upper end of the right rear wheel well 58R is bent outward in the vehicle width direction. The right rear wheel well 58R is configured to house a right rear wheel RRW. The right rear wheel well 58R is configured to support an upper end part of a damper configured to support the right rear wheel RRW.

In the passenger compartment CB, a driver's seat 61 and a passenger seat 62 are provided abreast such that the central tunnel 51d is sandwiched between the driver's seat 61 and the passenger seat 62 in the vehicle width direction. A backseat 63 extending across the passenger compartment CB in the vehicle width direction is also provided behind the driver's seat 61 and the passenger seat 62. In the present embodiment, the driver's seat 61 is provided to the left of the central tunnel 51d, and the passenger seat 62 is provided to the right of the central tunnel 51d.

The driver's seat 61 includes: a seat 611 that extends in the vehicle length and the vehicle width directions and has a predetermined thickness in the vehicle height direction; a back 612 that extends from a rear end of the seat 611 in the vehicle height and the vehicle width directions and has a predetermined thickness in the vehicle length direction; and a headrest 613 provided at an upper end of the back 612. The driver of the vehicle V is to sit in the driver's seat 61. An upper surface 611a of the seat 611 is a seat surface 61a on which the driver puts his/her nates and femora. The seat 611 is configured to support the driver's nates and femora with the seat surface 61a. A front surface 612a of the back 612 is a back surface 61b on which the driver puts his/her pelvic region and dorsum. The back 612 is configured to support the driver's pelvic region and dorsum with the back surface 61b. The headrest 613 is configured to support the driver's occiput.

The passenger seat 62 includes: a seat 621 that extends in the vehicle length and the vehicle width directions and has a predetermined thickness in the vehicle height direction: a back 622 that extends from a rear end of the seat 621 in the vehicle height and the vehicle width directions and has a predetermined thickness in the vehicle length direction; and a headrest 623 provided at an upper end of the back 622. A passenger of the vehicle V is to sit in the passenger seat 62. An upper surface 621a of the seat 621 is a seat surface 62a on which the passenger puts his/her nates and femora. The seat 621 is configured to support the passenger's nates and femora with the seat surface 62a. A front surface 622a of the back 622 is a back surface 62b on which the passenger puts his/her pelvic region and dorsum. The back 622 is configured to support the passenger's pelvic region and dorsum with the back surface 62b. The headrest 623 is configured to support the passenger's occiput.

The front floor beam 55 and the rear floor beam 56 extend in the vehicle width direction below the seat 611 of the driver's seat 61 and the seat 621 of the passenger seat 62. Since the front floor beam 55 can be placed in a space between the front floor panel 51a and the seat 611 of the driver's seat 61 and the rear floor beam 56 can be placed in a space between the front floor panel 51a and the seat 621 of the passenger seat 62, room in the passenger compartment CB for passengers or the driver of the vehicle V is efficiently secured.

The backseat 63 includes: a seat 631 that extends in the vehicle length and the vehicle width directions and has a predetermined thickness in the vehicle height direction; a back 632 that extends from a rear end of the seat 631 in the vehicle height and the vehicle width directions and has a predetermined thickness in the vehicle length direction; and a headrest 633 provided at an upper end of the back 632. A plurality of the (for example, three) headrests 633 are provided abreast in the vehicle width direction at the upper end of the back 632. Passengers are to sit in the backseat 63. An upper surface 631a of the seat 631 is a seat surface 63a on which the passengers put their nates and femora. The seat 631 is configured to support the passengers' nates and femora with the seat surface 63a. A front surface 632a of the back 632 is a back surface 63b on which the passengers put their pelvic regions and dorsa. The back 632 is configured to support the passengers' pelvic regions and dorsa with the back surface 63b. The headrest 633 is configured to support the passengers' occipita. The seat 631 of the backseat 63 is placed right above a front part of the rear floor panel 51b and the kick-up 51c. The front floor panel 51a and the rear floor panel 51b are connected below the backseat 63. Therefore, the passengers sit in the backseat 63 can put their feet on a rear part of the front floor panel 51a.

Placement of High-Voltage Power Source

The high-voltage power source 31 of the high-voltage power supply system 30 is placed below the floor panel 51 outside the passenger compartment CB and the luggage compartment LG.

First Arrangement Example of Main and Backup Low-voltage Power Sources

A first arrangement example of the main low-voltage power source 11 of the main power supply system 10 and the backup low-voltage power source 23 of the backup power supply system 20 will be described with reference to FIGS. 5 to 7.

Figure 6:
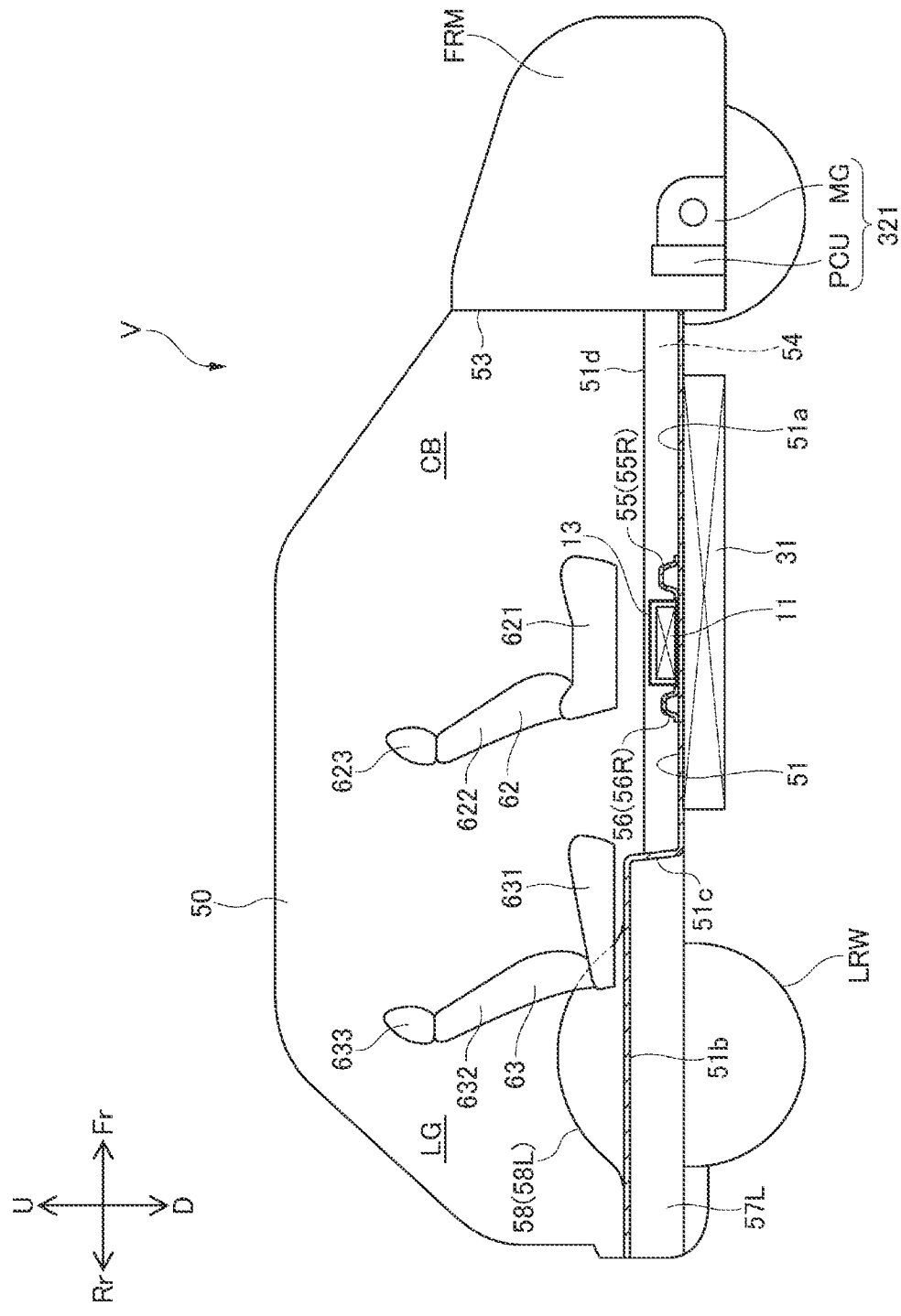
FIG. 6 is a side view of the main part of the vehicle as viewed from the right side according to the first arrangement example.
Figure 7:
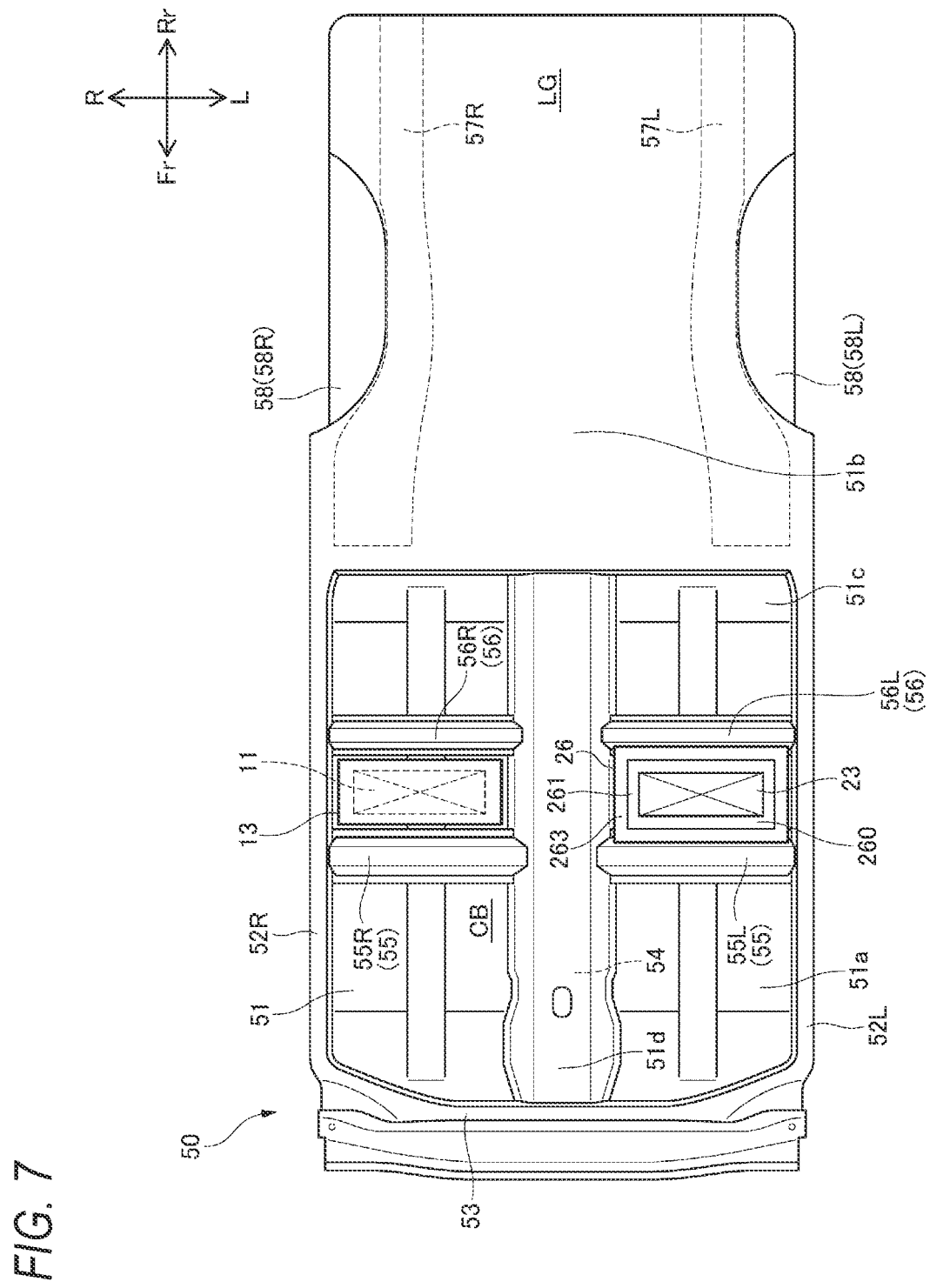
FIG. 7 is a top view of the lower part of the vehicle body of the vehicle and the main and the backup low-voltage power sources shown in FIGS. 5 and 6.

As shown in FIGS. 6 and 7, the main low-voltage power source 11 is placed to the right of the central tunnel 51d, underneath the passenger seat 62, and right above the front floor panel 51a.

The main low-voltage power source 11 is housed in a main low-voltage power source case 13. In addition to the main low-voltage power source 11, the main low-voltage power source case 13 may further house a battery management system configured to monitor an input/output voltage or a temperature of the main low-voltage power source, to estimate remaining battery life or degradedness of the main low-voltage power source 11, to control electricity for overheat or overcharge protection of the main low-voltage power source 11, to manage charging profiles of the main low-voltage power source 11, or to balance remaining battery life of each battery cell included in the main low-voltage power source 11.

The main low-voltage power source case 13 is placed in the passenger compartment CB of the vehicle V. The main low-voltage power source case 13 is placed to the right of the central tunnel 51d and below the passenger seat 62 and is mounted on an upper surface of the front floor panel 51a. In the present example, the main low-voltage power source case 13 is placed below the seat 621 of the passenger seat 62 and between the right front floor beam 55R and the right rear floor beam 56R and is mounted on the upper surface of the front floor panel 51a.

In this manner, the main low-voltage power source 11, which is housed in the main low-voltage power source case 13, is mounted on the upper surface of the front floor panel 51a below the passenger seat 62 in the passenger compartment CB. As viewed from the vehicle height direction, the main low-voltage power source 11 overlaps with the seat 621 of the passenger seat 62.

Since the main low-voltage power source case 13 is placed in a space between the front floor panel 51a and the seat 621, the main low-voltage power source case 13 can be placed in the passenger compartment CB without reducing the room for the passengers or the driver in the passenger compartment CB.

Figure 5:
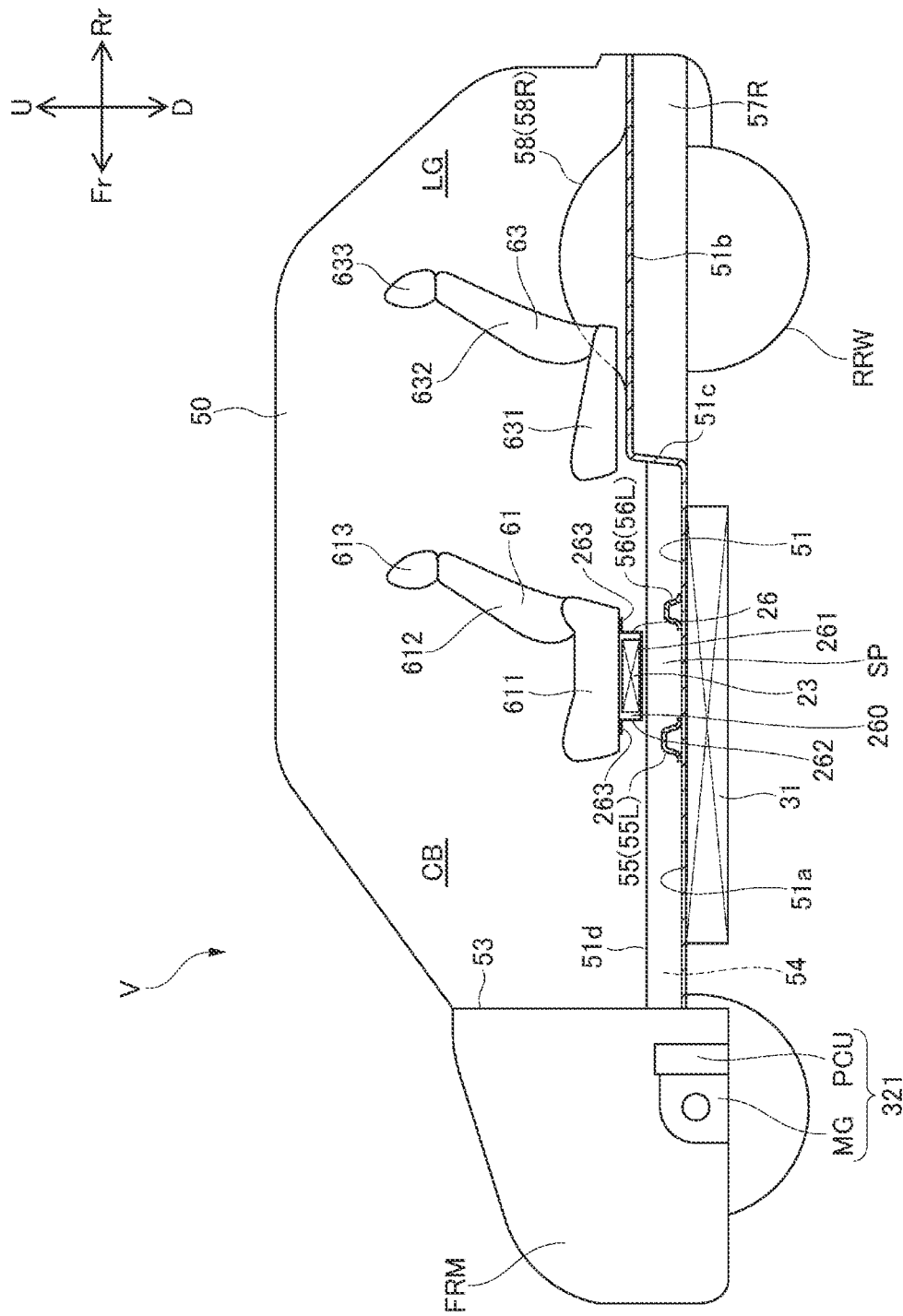
FIG. 5 is a side view of a main part of the vehicle as viewed from the left side according to a first arrangement example of a main low-voltage power source and a backup low-voltage power source.

As shown in FIGS. 5 and 7, the backup low-voltage power source 23 is placed to the left of the central tunnel 51d, underneath the driver's seat 61, and right above the front floor panel 51a.

The backup low-voltage power source 23 is housed in a backup low-voltage power source case 26. The backup low-voltage power source case 26 includes: an undersurface 261 that extends in the vehicle length and the vehicle width directions and has a substantially rectangular shape as viewed from the vehicle height direction; and a side wall 262 that extends from front, rear, left, and right edges of the undersurface 261 to surrounds the front, rear, left, and right edges. The backup low-voltage power source case 26 thus has a bathtub shape having an opening upward. In the backup low-voltage power source case 26, a housing 260 is formed by the undersurface 261 and the side wall 262. A flange 263 protruding outward from the backup low-voltage power source case 26 is formed at an upper end of the side wall 262. A plurality of holes penetrating the flange 263 in the vehicle height direction is formed in the flange portion 263 to surround the front, rear, left, and right edges of the undersurface 261.

The backup low-voltage power source 23 is housed in the housing 260 and is fixed in the backup low-voltage power source case 26. The undersurface 261 is configured to cover a lower surface of the backup low-voltage power source 23, and the side wall 262 is configured to cover front, rear, left, and right side surfaces of the backup low-voltage power source unit 23.

In addition to the backup low-voltage power source 23, the switcher 24 or the controller 25 of the backup power source unit 21 may be housed in the housing 260. The switcher 24 or the controller 25 of the backup power source unit 21 may be placed outside the backup low-voltage power source case 26 or may be placed not below the driver's seat 61.

The backup low-voltage power source case 26 accommodating the backup low-voltage power source 23 is fixed to the lower surface of the seat 611 of the driver's seat 61 with fixing members, such as bolts, inserted upward through the holes formed in the flange 263.

In this manner, the backup low-voltage power source 23, which is housed in the backup low-voltage power source case 26, is hung on the driver's seat 61 and is placed below the driver's seat 61 and right above the front floor panel 51a in the passenger compartment CB. As viewed from the vehicle height direction, the backup low-voltage power source 23 overlaps with the seat 611 of the driver's seat 61. The backup low-voltage power source 23 is placed right above the front floor panel 51a and underneath the seat 611 of the driver's seat 61 in the passenger compartment CB, and a space SP is provided in the vehicle height direction between the front floor panel 51a and the backup low-voltage power source 23.

As described above, the main low-voltage power source 11 is placed to the right of the central tunnel 51d, below the passenger seat 62, and right above the front floor panel 51a, and the backup low-voltage power source 23 is placed to the left of the central tunnel 51d, below the driver's seat 61, and right above the front floor panel 51a.

The high-voltage power source 31 is placed below the floor panel 51, whereas the main low-voltage power source 11 and the backup low-voltage power source 23 are placed right above the floor panel 51. Since the high-voltage power source 31 is separated from the main low-voltage power source 11 and the backup low-voltage power source 23 by the floor panel 51 in the vehicle height direction, a risk can be reduced that collision or flood damage may cause a cutoff of electricity supplied from the main low-voltage power source 11 or the backup low-voltage power source 23 simultaneously with a cutoff of electricity supplied from the high-voltage power source 31. In addition, since both the main low-voltage power source 11 and the backup low-voltage power source 23 are placed right above the floor panel 51, a risk can be reduced that flood damage may cause a cutoff of the electricity supplied from the main low-voltage power source 11 or the backup low-voltage power source 23 even if the lower part of the vehicle V is flooded due to a disaster or an accident. Further, since the main low-voltage power source 11 and the backup low-voltage power source 23 are separated from each other by the central tunnel 51d in the vehicle width direction above the front floor panel 51a, a risk can be reduced that collision or flood damage may simultaneously cause a cutoff of electricity supplied from the main low voltage power source 11 and a cutoff of electricity supplied from the backup low-voltage power source 23. Therefore, even if the lower part of the vehicle V is flooded due to a disaster or an accident, a risk of a power outage can be reduced.

Furthermore, since the main low-voltage power source 11 is placed below the passenger seat 62 and the backup low-voltage power source 23 is placed below the driver's seat 61, spaces below the driver's seat and the passenger seat can be efficiently used to place the main low-voltage power source 11 and the backup low-voltage power source 23 in the passenger compartment CB.

In the present example, the main low-voltage power source 11 overlaps with the seat 621 of the passenger seat 62 as viewed from the vehicle height direction, and the backup low-voltage power source 23 overlaps with the seat 611 of the driver's seat 61 as viewed from the vehicle height direction. In addition, the main low-voltage power source 11 and the backup low-voltage power source 23 have substantially the same dimensions in the vehicle width and the vehicle height directions.

As a result, manufacturing costs for the main low-voltage power source 11 and the backup low-voltage power source 23 can be reduced.

In the present example, the main low-voltage power source 11, which is housed in the main low-voltage power source case 13, is mounted on the upper surface of the front floor panel 51a below the passenger seat 62, whereas the backup low-voltage power source 23, which is housed in the backup low-voltage power source case 26, is hung on the driving seat 61 right above the front floor panel 51a with the space SP provided between the front floor panel 51a and the backup low-voltage power source 23 in the vehicle height direction. Therefore, the main low-voltage power source 11 and the backup low-voltage power source 23 are placed at different positions in the vehicle height direction.

Accordingly, even if the lower part of the vehicle V is flooded due to a disaster or an accident, a risk can be reduced that electricity supplied from the main low-voltage power source 11 and electricity supplied from the backup low-voltage power source 23 may be cut off simultaneously.

The main low-voltage power source case 13 and the backup low-voltage power source case 26 do not have to be watertight.

As a result, the manufacturing costs for the main low-voltage power source case 13 and the backup low-voltage power source case 26 can be reduced.

Second Arrangement Example of Main and Backup Low-Voltage Power Sources

Next, a second arrangement example of the main low-voltage power source 11 of the main power supply system 10 and the backup low-voltage power source 23 of the backup power supply system 20 will be described with reference to FIGS. 8 and 9. In the following, components common to the first and the second arrangement examples are referred to by the same reference numerals, and description thereof will be omitted or simplified as appropriate.

Figure 8:
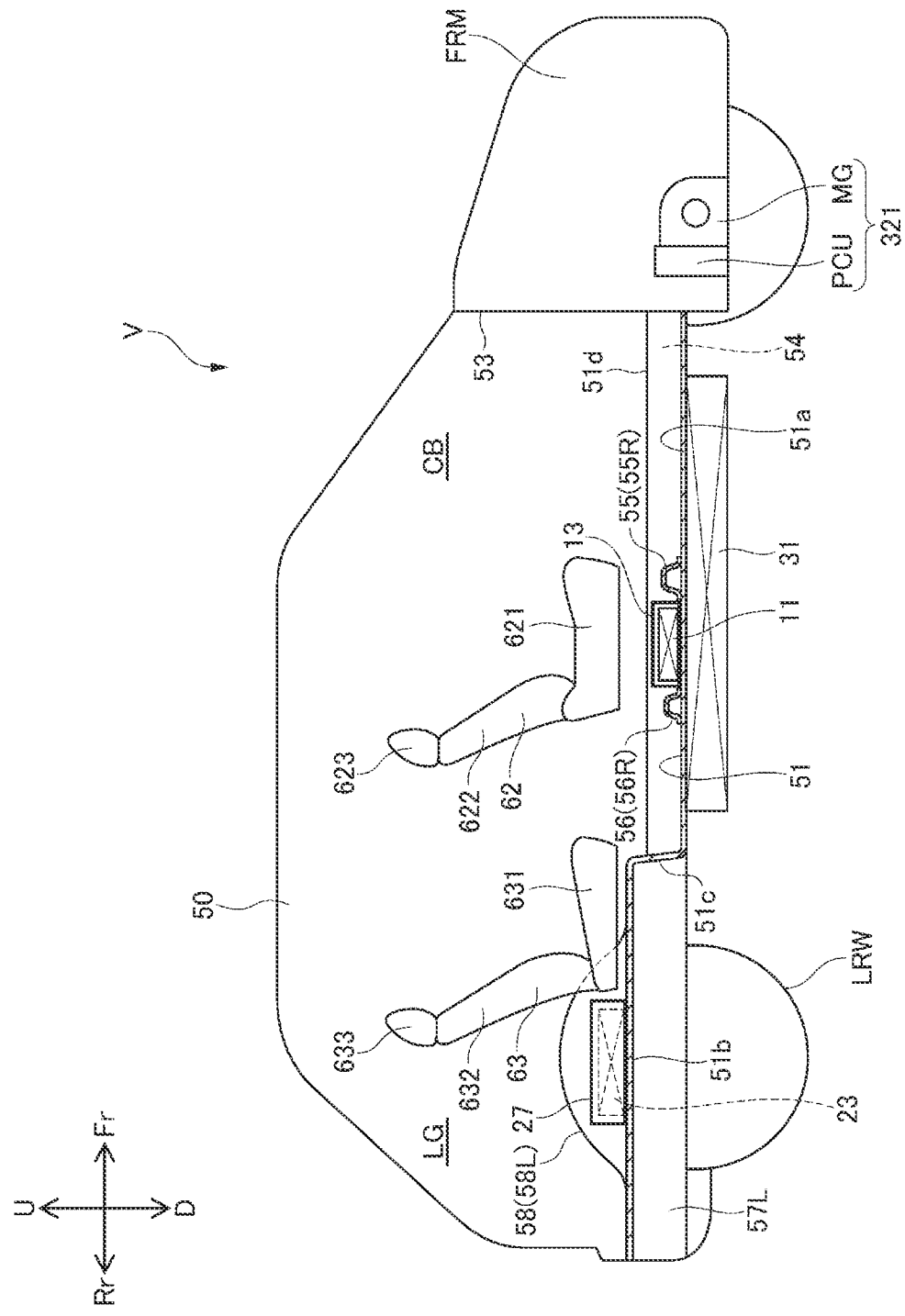
FIG. 8 is a side view of the main part of the vehicle as viewed from the right side according to a second arrangement example of the main and the backup low-voltage power sources.
Figure 9:
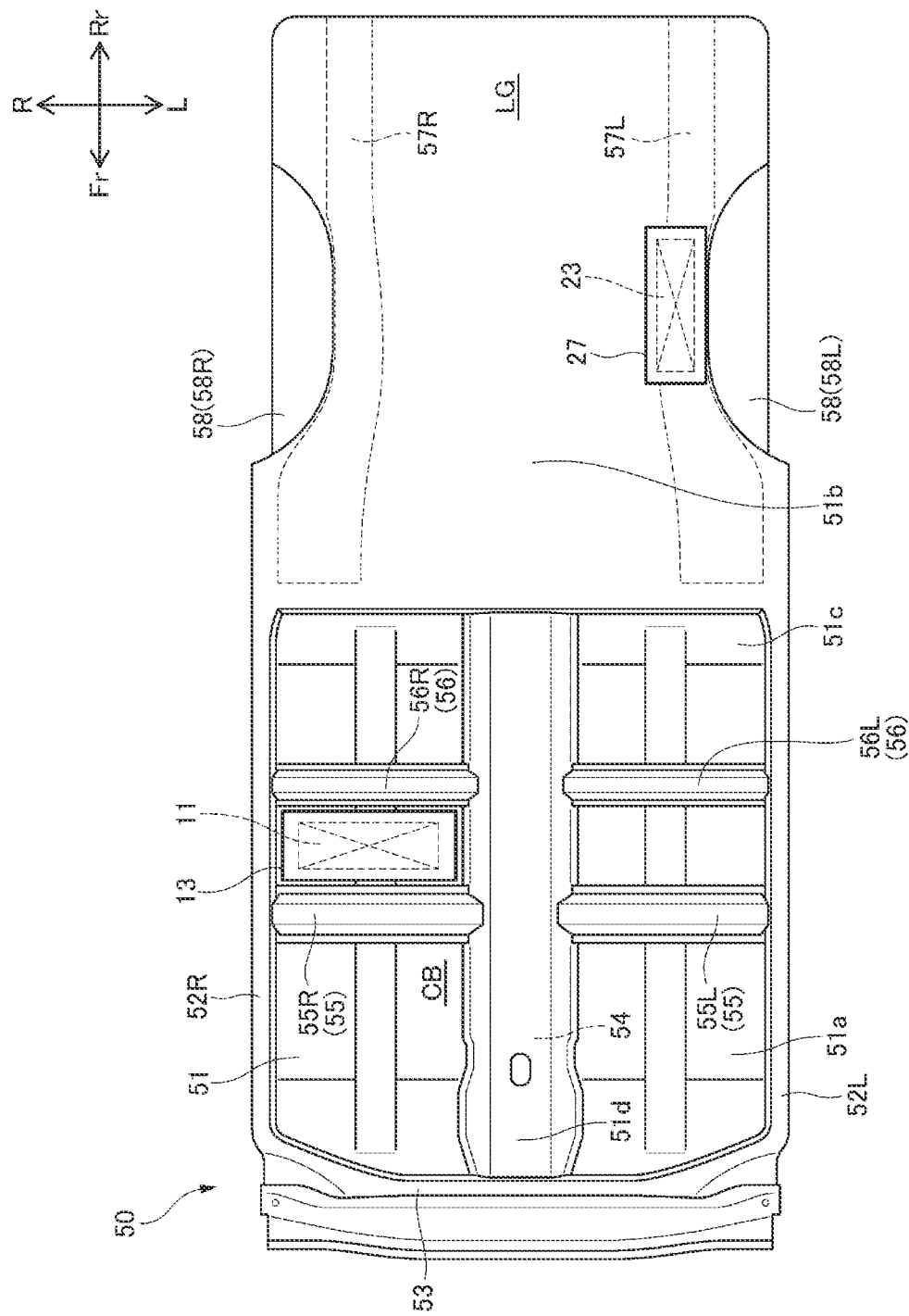
FIG. 9 is a top view of the lower part of the vehicle body of the vehicle and the main and the backup low-voltage power sources shown in FIG. 8.

As shown in FIGS. 8 and 9, similarly to the first arrangement example described above, the main low-voltage power source 11 is placed to the right of the central tunnel 51d, underneath the passenger seat 62, and right above the front floor panel 51a.

The main low-voltage power source 11 is housed in the main low-voltage power source case 13. In addition to the main low-voltage power source 11, the main low-voltage power source case 13 may further house a battery management system configured to monitor an input/output voltage or a temperature of the main low-voltage power source 11, to estimate remaining battery life or degradedness of the main low-voltage power source 11, to control electricity for overheat or overcharge protection of the main low-voltage power source 11, to manage charging profiles of the main low-voltage power source 11, or to balance remaining battery life of each battery cell included in the main low-voltage power source 11.

The main low-voltage power source case 13 is placed in the passenger compartment CB of the vehicle V. The main low-voltage power source case 13 is placed to the right of the central tunnel 51d and below the passenger seat 62 and is mounted on the upper surface of the front floor panel 51a. In the present example, the main low-voltage power source case 13 is placed below the seat 621 of the passenger seat 62 and between the right front floor beam 55R and the right rear floor beam 56R and is mounted on the upper surface of the front floor panel 51a.

In this manner, the main low-voltage power source 11, which is housed in the main low-voltage power source case 13, is mounted on the upper surface of the front floor panel 51a below the passenger seat 62 in the passenger compartment CB. As viewed from the vehicle height direction, the main low-voltage power source 11 overlaps with the seat 621 of the passenger seat 62.

The backup low-voltage power source 23 is placed to the left to the center of the vehicle V right above the rear floor panel 51b.

In the present example, the backup low-voltage power source 23 is housed in a backup low-voltage power source case 27. The backup low-voltage power source case 27 has, for example, a substantially rectangular parallelepipedic shape to include front, rear, left, right, upper, and lower surfaces. The backup low-voltage power source 23 is housed in a space surrounded by the front, the rear, the left, the right, the upper, and the lower surfaces of the backup low-voltage power source case 27.

In addition to the backup low-voltage power source 23, the switcher 24 or the controller 25 of the backup power source unit 21 may be housed in the space. The switcher 24 or the controller 25 of the backup power source unit 21 may be placed outside the backup low-voltage power source case 27 or may be placed not above the rear floor panel 51b.

The backup low-voltage power source case 27 configured to house the backup low-voltage power source 23 is adjacent to the left rear wheel well 58L, is closer to the center of the vehicle V in the vehicle width direction than the left rear wheel well 58L is, and is fixed to the upper surface of the rear floor panel 51b. As viewed from the vehicle width direction, the backup low-voltage power source case 27 overlaps with the left rear wheel well 58L.

Therefore, in the present example, the main low-voltage power source 11 is placed right above the front floor panel 51a, whereas the backup low-voltage power source 23 is placed right above the rear floor panel 51b.

The high-voltage power source 31 is placed below the floor panel 51, whereas the main low-voltage power source 11 and the backup low-voltage power source 23 are placed right above the floor panel 51. Since the high-voltage power source 31 is separated from the main low-voltage power source 11 and the backup low-voltage power source 23 by the floor panel 51 in the vehicle height direction, a risk can be reduced that collision or flood damage may cause a cutoff of electricity supplied from the main low-voltage power source 11 or the backup low-voltage power source 23 simultaneously with a cutoff of electricity supplied from the high-voltage power source 31. In addition, since both the main low-voltage power source 11 and the backup low-voltage power source 23 are placed right above the floor panel 51, a risk can be reduced that flood damage may cause a cutoff of the electricity supplied from the main low-voltage power source 11 or the backup low-voltage power source 23 even if the lower part of the vehicle V is flooded due to a disaster or an accident. Further, since the rear floor panel 51b extends in the vehicle length and the vehicle width directions behind the front floor panel 51a and right above the front floor panel 51a, the main low-voltage power source 11 and the backup low-voltage power source 23 are placed apart in the vehicle length direction and at different positions in the vehicle height direction. As a result, a risk can be reduced that collision or flood damage may simultaneously cause a cutoff of electricity supplied from the main low-voltage power source 11 and a cutoff of electricity supplied from the backup low-voltage power source 23. Therefore, even if the lower part of the vehicle V is flooded due to a disaster or an accident, a risk of a power outage can be reduced.

The main low-voltage power source 11 is placed underneath the front passenger seat 62, which is placed to the right of the center of the vehicle V, whereas the backup low-voltage power source 23 of the backup power supply system 20 is placed to the left of the center of the vehicle V.

By placing the main low-voltage power source 11 and the backup low-voltage power source 23, which are heavy, in this manner in the vehicle width direction of the vehicle V, it is possible to achieve weight distribution balanced in the vehicle width direction of the vehicle V.

The main low-voltage power source case 13 and the backup low-voltage power source case 27 do not have to be watertight.

As a result, manufacturing costs for the main low-voltage power source case 13 and the backup low-voltage power source case 27 can be reduced.

Third Arrangement Example of Main and Backup Low-voltage Power Sources

Next, a third arrangement example of the main low voltage power source 11 of the main power supply system 10 and the backup low-voltage power source 23 of the backup power supply system 20 will be described with reference to FIGS. 10 to 12. In the following, components common to the first, the second, the third arrangement examples are referred to by the same reference numerals, and description thereof will be omitted or simplified as appropriate.

Figure 10:
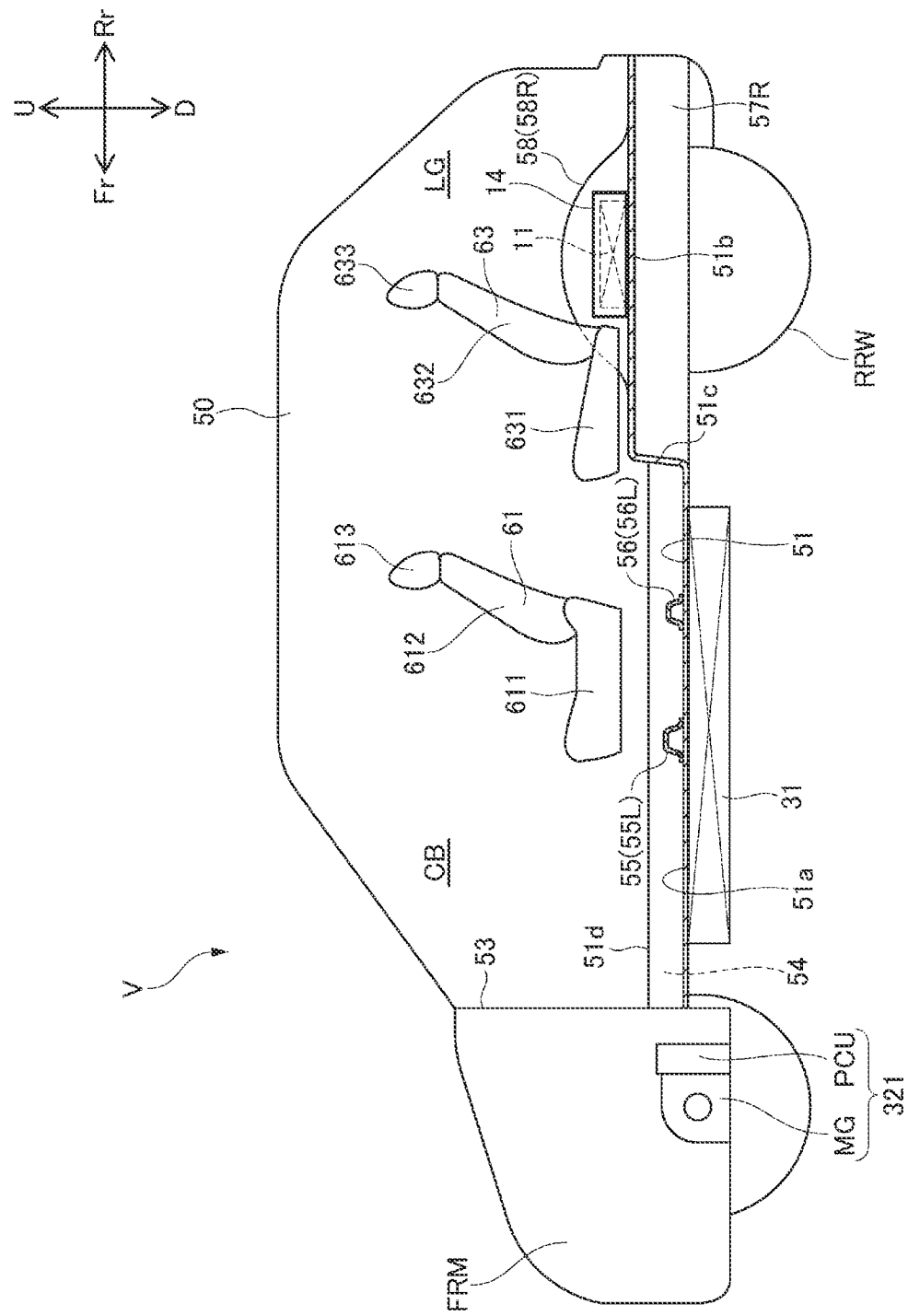
FIG. 10 is a side view of the main part of the vehicle as viewed from the left side according to a third arrangement example of the main and the backup low-voltage power sources.
Figure 12:
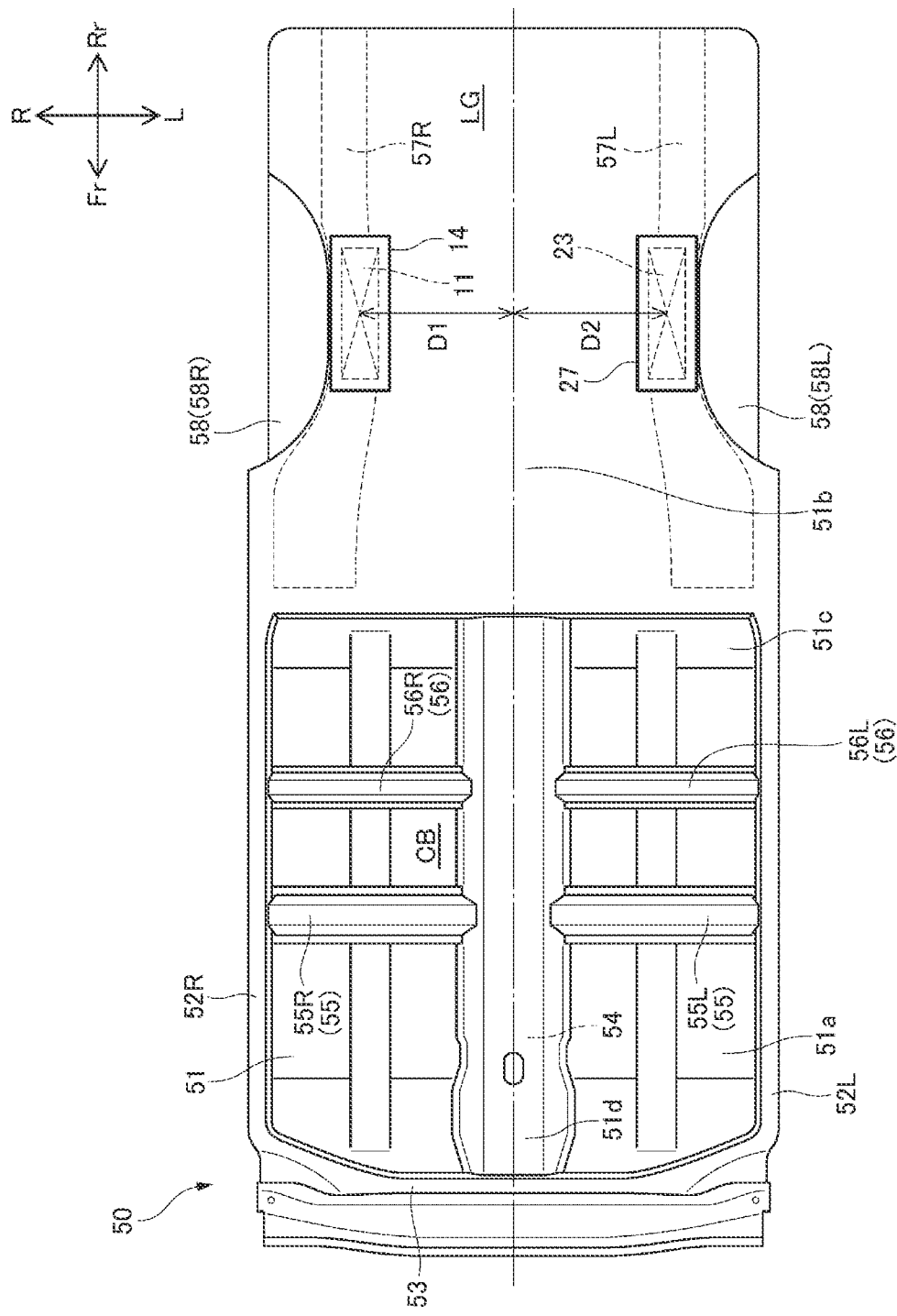
FIG. 12 is a top view of the lower part of the vehicle body of the vehicle and the main and the backup low-voltage power sources shown in FIGS. 10 and 11.

As shown in FIGS. 10 and 12, the main low-voltage power source 11 is to the right of the center of the vehicle V right above the rear floor panel 51b.

In the present example, the main low-voltage power source 11 is housed in a main low-voltage power source case 14. The main low-voltage power source case 14 has, for example, a substantially rectangular parallelepipedic shape to include front, rear, left, right, upper, and lower surfaces. The main low-voltage power source 11 is housed in a space surrounded by the front, the rear, the left, the right, the upper, and the lower surfaces of the main low-voltage power source case 14.

In addition to the main low-voltage power source 11, the space may further house a battery management system configured to monitor an input/output voltage or a temperature of the main low-voltage power source 11, to estimate remaining battery life or degradedness of the main low-voltage power source 11, to control electricity for overheat or overcharge protection of the main low-voltage power source 11, to manage charging profiles of the main low-voltage power source 11, or to balance remaining battery life of each battery cell included in the main low-voltage power source 11.

The main low-voltage power source case 14 is adjacent to the right rear wheel well 58R, is closer to the center of the vehicle V in the vehicle width direction than the right rear wheel well 58R is, and is fixed to the upper surface of the rear floor panel 51b. As viewed from the vehicle width direction, the main low-voltage power source case 14 overlaps with the right rear wheel well 58R.

Figure 11:
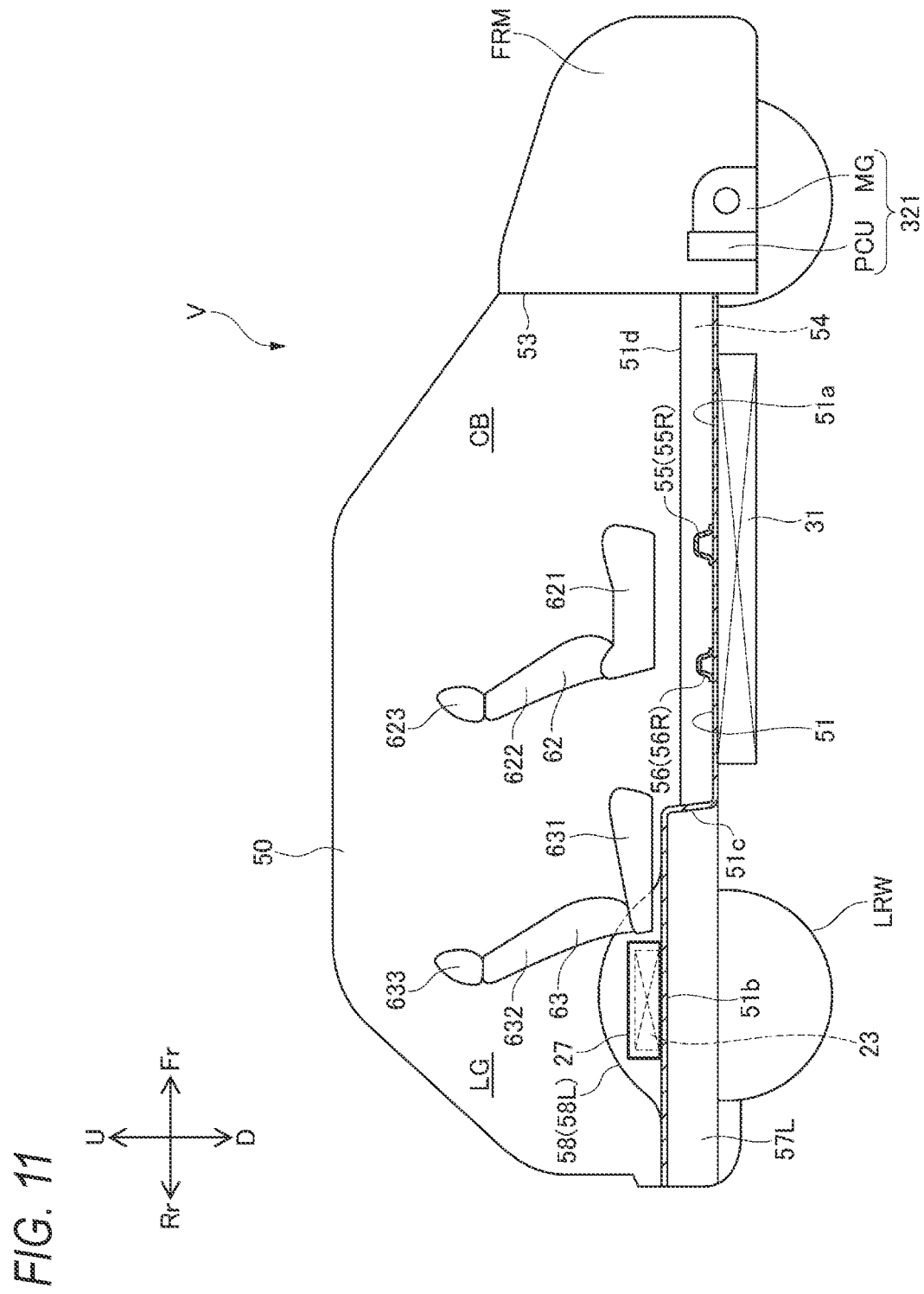
FIG. 11 is a side view of the main part of the vehicle as viewed from the right side according to the third arrangement example.

As shown in FIGS. 11 and 12, similarly to the second arrangement example described above, the backup low-voltage power source 23 is placed to the left of the center of the vehicle V right above the rear floor panel 51b.

Similarly to the second arrangement example described above, the backup low-voltage power source 23 is housed in the backup low-voltage power source case 27. The backup low-voltage power source case 27 has, for example, a substantially rectangular parallelepipedic shape to include front, rear, left, right, upper, and lower surfaces. The backup low-voltage power source 23 is housed in a space surrounded by the front, the rear, the left, the right, the upper, and the lower surfaces of the backup low-voltage power source case 27.

In addition to the backup low-voltage power source 23, the switcher 24 or the controller 25 of the backup power source unit 21 may be housed in the space. The switcher 24 or the controller 25 of the backup power source unit 21 may be placed outside the backup low-voltage power source case 27 or may be placed not above the rear floor panel 51b.

The backup low-voltage power source case 27 is adjacent to the left rear wheel well 58L, is closer to the center of the vehicle V in the vehicle width direction than the left rear wheel well 58L is, and is fixed to the upper surface of the rear floor panel 51b. As viewed from the vehicle width direction, the backup low-voltage power source case 27 overlaps with the left rear wheel well 58L.

In this manner, the main low-voltage power source 11 is placed to the right of the center of the vehicle V right above the rear floor panel 51b, whereas the backup low-voltage power source 23 is placed to the left of the center of the vehicle V right above the rear floor panel 51b. In the present example, the main low-voltage power source 11 and the backup low-voltage power source 23 are separated from each other by the center of the vehicle V in the vehicle width direction such that an offset distance D1 in the vehicle width direction between the center of the vehicle V and the main low-voltage power source 11 is equal to an offset distance D2 in the vehicle width direction between the center of the vehicle V and the backup low-voltage power source 23.

The high-voltage power source 31 is placed below the floor panel 51, whereas the main low-voltage power source 11 and the backup low-voltage power source 23 are placed right above the floor panel 51. Since the high-voltage power source 31 is separated from the main low-voltage power source 11 and the backup low-voltage power source 23 by the floor panel 51 in the vehicle height direction, a risk can be reduced that collision or flood damage may cause a cutoff of electricity supplied from the main low-voltage power source 11 or the backup low-voltage power source 23 simultaneously with a cutoff of electricity from the high-voltage power source 31. In addition, since both the main low-voltage power source 11 and the backup low-voltage power source 23 are placed right above the floor panel 51, a risk can be reduced that flood damage may cause a cutoff of the electricity supplied from the main low-voltage power source 11 and the backup low-voltage power source 23 even if the lower part of the vehicle V is flooded due to a disaster or an accident. Further, since both the main low-voltage power source 11 and the backup low-voltage power source 23 are placed right above the rear floor panel 51b, which extends in the vehicle length and the vehicle width directions above the front floor panel 51a, a risk can be further reduced that flood damage may cause a cutoff of electricity supplied from the main low-voltage power source 11 or the backup low-voltage power source 23 even if the lower part of the vehicle V is flooded due to a disaster or an accident. Therefore, even if the lower part of the vehicle V is flooded due to a disaster or an accident, a risk of a power outage can be reduced.

Furthermore, since the main low-voltage power source 11 and the backup low-voltage power source 23 are placed such that the offset distance D1 in the vehicle width direction between the center of the vehicle V and the main low-voltage power source 11 is equal to the offset distance D2 in the vehicle width direction between the center of the vehicle V and the backup low-voltage power source 23, it is possible to achieve weight distribution balanced in the vehicle width direction.

The main low-voltage power source 11 is closer to the center of the vehicle V in the vehicle width direction than the right rear wheel well 58R and overlaps with the right rear wheel well 58R as viewed from the vehicle width direction. The backup low-voltage power source 23 is closer to the center of the vehicle V in the vehicle width direction than the left rear wheel well 58L and overlaps with the left rear wheel well 58L as viewed from the vehicle width direction.

Since the left rear wheel well 58L is configured to support the damper, which is configured to support the left rear wheel LRW, and the right rear wheel well 58R is configured to support the damper, which is configured to support the right rear wheel RRW, the left rear wheel well 58L and the right wheel well 58R have higher rigidity than the floor panel 51 has in general.

Therefore, even if an impact of a side collision is applied to a lateral of the vehicle V, the main low-voltage power source 11 and the backup low-voltage power source 23 are protected by the left rear wheel well 58L and the right rear wheel well 58R from the impact. Therefore, even if an impact in the vehicle width direction is applied to the lateral of the vehicle V, a risk can be reduced that damage from the impact may cause a cutoff of electricity supplied from the main low-voltage power source 11 or the backup low-voltage power source 23.

The main low-voltage power source case 14 and the backup low-voltage power source case 27 do not have to be watertight.

As a result, manufacturing costs for the main low-voltage power source case 14 and the backup low-voltage power source case 27 can be reduced.

Although embodiments of the present disclosure has been described above with reference to the drawings, it goes without saying that the present disclosure is not limited thereto. It will be apparent to those skilled in the art that various changes and modifications may be made within the scope of the claims and should be included in the technical scope of the present disclosure. In addition, components in the embodiments may be arbitrary combined without departing from the gist of the present disclosure.

In the first arrangement example, the main low-voltage power source 11 is placed to the right of the central tunnel 51d, underneath the passenger seat 62, and right above the front floor panel 51a, and the backup low-voltage power source 23 is placed to the left of the central tunnel 51d, underneath the driver's seat 61, and right above the front floor panel 51a. The main low-voltage power source 11 and the backup low-voltage power source 23, however, may change places with each other.

In the first arrangement example, the main low-voltage power source 11 and the backup low-voltage power supply 23 are placed at different positions in the vehicle height direction such that the backup low-voltage power source 23 is placed right above the main low-voltage power supply 11. The main low-voltage power source 11 and the backup low-voltage power source 23, however, may be placed at different positions in the vehicle height direction such that the main low-voltage power source 11 is above the backup low-voltage power source 23.

In the second arrangement example, the main low-voltage power source 11 is placed right above the front floor panel 51a, whereas the backup low-voltage power source 23 is placed right above the rear floor panel 51b. The main low-voltage power source 11 and the backup low-voltage power source 23, however, may change places with each other.

In the second arrangement example, the main low-voltage power source 11 is placed to the right of the central tunnel 51d, whereas the backup low-voltage power source 23 is placed to the left to the center of the vehicle V. The main low-voltage power source 11 and the backup low-voltage power source 23, however, may be placed such that the main low-voltage power source 11 is placed to the left of the central tunnel 51d and the backup low-voltage power source 23 is placed to the right to the center of the vehicle V.

In the third arrangement example, the main low-voltage power source 11 is placed right above the front floor panel 51b and to the right of the center of the vehicle V, whereas the backup low-voltage power source 23 is placed right above the rear floor panel 51b and to the left of the center of the vehicle V. The main low-voltage power source 11 and the backup low-voltage power source 23, however, may change places with each other.

In the present disclosure, at least the following are described. Although corresponding components and the like are shown in parentheses, the present disclosure is not limited thereto.

(1) A vehicle (V), including:
a rotating electrical machine (MG) configured to drive the vehicle;
a high-voltage power source (31) configured to supply electricity for driving the rotating electrical machine;
a main low-voltage power source (11) configured to supply electricity whose output voltage is lower than an output voltage of the high-voltage power source;
a normal load (12) configured to operate on the electricity supplied from the main low-voltage power source;
a backup low-voltage power source (23) configured to supply electricity whose output voltage is lower than that of the high-voltage power source;
a critical load (22) configured to operate on the electricity supplied from the backup low-voltage power source; and
a floor panel (51) that extends in a vehicle length direction and a vehicle width direction and is configured to constitute a lower part of a vehicle body (50) at least in part, in which
the critical load includes:
an auxiliary load for controlling the vehicle;
an auxiliary load for braking the vehicle;
an auxiliary load for steering the vehicle; or
an auxiliary load for acquiring external information of the vehicle, a central tunnel (51*d*) that is convex upward and extends in a central part of the vehicle in the vehicle width direction along the vehicle length direction is formed in the floor panel, one of the main and the backup low-voltage power sources is placed right above the floor panel and to one side of the central tunnel in the vehicle width direction, and the other one of the main and the backup low-voltage power sources is placed right above the floor panel and to the other side of the central tunnel in the vehicle width direction.

According to (1), since both the main and the backup low-voltage power sources are placed right above the floor panel, a risk can be reduced that flood damage may cause a cutoff of the electricity supplied from the main or the backup low-voltage power source even if the lower part of the vehicle is flooded due to a disaster or an accident. In addition, since the main low-voltage power source is separated from the backup low-voltage power source by the central tunnel in the vehicle width direction, a risk can be reduced that collision or flood damage may simultaneously cause a cutoff of the electricity supplied from the main low-voltage power source and a cutoff of that supplied from the backup low-voltage power source. Therefore, even if the lower part of the vehicle is flooded due to a disaster or an accident, a risk of a power outage can be reduced.

(2) The vehicle according to (1), further including:

a first seat (passenger seat 62) placed right above the floor panel and to the one side of the central tunnel in the vehicle width direction; and a second seat (driver's seat 61) placed right above the floor panel and to the other side of the central tunnel in the vehicle width direction, in which the one of the main and the backup low-voltage power sources is placed below the first seat, and the other one of the main and the backup low-voltage power sources is placed below the second seat.

According to (2), the one of the main and the backup low-voltage power source is placed below the first seat, whereas the other one of the main and the backup low-voltage power sources is placed below the second seat. Therefore, spaces below the first and the second seats can be efficiently used to place the main and the backup low-voltage power sources in a passenger compartment.

(3) The vehicle according to (2), in which the one of the main and the backup low-voltage power sources overlaps with the first seat as viewed from a vehicle height direction, the other one of the main and the backup low-voltage power sources overlaps with the second seat as viewed from the vehicle height direction, and the main and the backup low-voltage power sources have substantially the same dimensions in the vehicle width and the vehicle length directions.

According to (3), the one of the main and the backup low-voltage power sources overlaps with the first seat as viewed from the vehicle height direction, and the other one of the main and the backup low-voltage power sources overlaps with the second seat as viewed from the vehicle height direction. Therefore, the main and the backup low-voltage power source can be placed in the passenger compartment without reducing room for passengers or a driver in the passenger compartment. In addition, since the main and the backup low-voltage power sources have substantially the same dimensions in the vehicle width and the vehicle length directions, manufacturing costs for the main and the backup low-voltage power sources can be reduced.

(4) The vehicle according to any one of (1) to (3), in which the main and the backup low-voltage power sources are placed at different positions in the vehicle height direction.

According to (4), a risk can be reduced that the electricity supplied from the main low-voltage power source and that supplied from the backup low-voltage power source may be cut off simultaneously even if the lower part of the vehicle is flooded due to a disaster or an accident.

(5) A vehicle (V), including:

a rotating electrical machine (MG) configured to drive the vehicle;

a high-voltage power source (31) configured to supply electricity for driving the rotating electrical machine;

a main low-voltage power source (11) configured to supply electricity whose output voltage is lower than an output voltage of the high-voltage power source;

a normal load (12) configured to operate on the electricity supplied from the main low-voltage power source;

a backup low-voltage power source (23) configured to supply electricity whose output voltage is lower than that of the high-voltage power source;

a critical load (22) configured to operate on the electricity supplied from the backup low-voltage power source; and a floor panel (51) that extends in a vehicle length direction and a vehicle width direction and is configured to constitute a lower part of a vehicle body (50) at least in part, in which the critical load includes:

an auxiliary load for controlling the vehicle;
an auxiliary load for braking the vehicle;
an auxiliary load for steering the vehicle; or
an auxiliary load for acquiring external information of the vehicle, the floor panel includes:

a front floor panel (51*a*) that extends in the vehicle length and the vehicle width directions and is configured to constitute a floor of a passenger compartment (CB); and a rear floor panel (51*b*) that extends in the vehicle length and the vehicle width directions behind and above the front floor panel and is configured to constitute a floor of a luggage compartment (LG) provided behind the passenger compartment, one of the main and the backup low-voltage power sources is placed right above the front floor panel, and the other one of the main and the backup low-voltage power sources is placed right above the rear floor panel.

According to (5), since both the main and the backup low-voltage power sources are placed right above the floor panel, a risk can be reduced that the flood damage may cause a cutoff of the electricity supplied from the main or the backup low-voltage power source even if the lower part of the vehicle is flooded due to a disaster or an accident. In addition, since the rear floor panel extends in the vehicle length and the vehicle width directions behind and above the front floor panel, the main and the backup low-voltage power sources are placed apart in the vehicle length direction and at different positions in the vehicle height direction. As a result, a risk can be reduced that collision or flood damage may simultaneously cause a cutoff of the electricity supplied from the main low-voltage power source and a cutoff of that supplied from the backup low-voltage power source. Therefore, even if the lower part of the vehicle is flooded due to a disaster or an accident, a risk of a power outage can be reduced.

(6) The vehicle according to (5), further including:
a first seat (passenger seat 62) placed right above the front floor panel and to one side of a center of the vehicle in the vehicle width direction, and
a second seat (driver's seat 61) placed right above the front floor panel and to the other side of the center of the vehicle in the vehicle width direction, in which
one of the main and the backup low-voltage power sources is placed below the first seat, and
the other one of the main and the backup low-voltage power sources is placed to the other side of the center of the vehicle in the vehicle width direction.

According to (6), the main and the backup low-voltage power sources, which are heavy, are separated from each other by the center in the vehicle width direction. Therefore, it is possible to achieve weight distribution balanced in the vehicle width direction of the vehicle.

(7) A vehicle (V), including:
a rotating electrical machine (MG) configured to drive the vehicle;
a high-voltage power source (31) configured to supply electricity for driving the rotating electrical machine;
a main low-voltage power source (11) configured to supply electricity whose output voltage is lower than an output voltage of the high-voltage power source;
a normal load (12) configured to operate on the electricity supplied from the main low-voltage power source;
a backup low-voltage power source (23) configured to supply electricity whose output voltage is lower than that of the high-voltage power source;
a critical load (22) configured to operate on the electricity supplied from the backup low-voltage power source; and
a floor panel (51) that extends in a vehicle length direction and a vehicle width direction and is configured to constitute a lower part of a vehicle body (50) at least in part, in which
the critical load includes:
an auxiliary load for controlling the vehicle;
an auxiliary load for braking the vehicle;
an auxiliary load for steering the vehicle; or
an auxiliary load for acquiring external information of the vehicle,
the floor panel includes:
a front floor panel (51*a*) that extends in the vehicle length and the vehicle width directions and is configured to constitute a floor of a passenger compartment (CB); and
a rear floor panel (51*b*) that extends in the vehicle length and the vehicle width directions behind and above the front floor panel and is configured to constitute a floor of a luggage compartment (LG) provided behind the passenger compartment,
one of the main and the backup low-voltage power sources is placed right above the rear floor panel and to one side of a center of the vehicle in the vehicle width direction,
the other one of the main and the backup low-voltage power sources is placed right above the rear floor panel and to the other side of the center of the vehicle in the vehicle width direction, and
the main and the backup low-voltage power sources are separated from each other by the center of the vehicle in the vehicle width direction such that an offset distance (D1) in the vehicle width direction between the center of the vehicle and the main low-voltage power source is equal to an offset distance (D2) in the vehicle width direction between the center of the vehicle and the backup low-voltage power source.

According to (7), since both the main and the backup low-voltage power sources are placed right above the floor panel, a risk can be reduced that the flood damage may cause a cutoff of the electricity supplied from the main or the backup low-voltage power source even if the lower part of the vehicle is flooded due to a disaster or an accident. In addition, the rear floor panel extends in the vehicle length and the vehicle width directions above the front floor panel, and both the main and the backup low-voltage power sources are placed right above the rear floor panel. As a result, even if the lower part of the vehicle is flooded due to a disaster or an accident, the risk can be further reduced that the flood damage may cause a cutoff of the electricity supplied from the main or the backup low-voltage power source. Therefore, even if the lower part of the vehicle is flooded due to a disaster or an accident, a risk of a power outage can be reduced.

Further, the main and the backup low-voltage power sources are separated from each other by the center in the vehicle width direction such that the offset distance in the vehicle width direction between the center and the main low-voltage power source is equal to the offset distance in the vehicle width direction between the center and the backup low-voltage power source. Therefore, it is possible achieve weight distribution balanced in the vehicle width direction of the vehicle.

(8) The vehicle according to (7), in which
each end of the rear floor panel in the vehicle width direction is provided with a rear wheel well (58), and
each of the main and the backup low-voltage power is closer to the center of the vehicle in the vehicle width direction than the rear wheel well and overlaps with the rear wheel well as viewed from the vehicle width direction.

According to (8), each of the main and the backup low-voltage power sources is closer to the center in the vehicle width direction than the rear wheel well and overlaps with the rear wheel well as viewed from the vehicle width direction. Even if an impact of a side collision is applied to a lateral of the vehicle, the main and the backup low-voltage power sources are protected by the rear wheel well from the impact. Therefore, even if the impact is applied to the lateral, the risk of a power outage can be reduced.

(9) The vehicle according to any one of (1) to (8), in which
the main low-voltage power source is housed in a main low-voltage power source case (13, 14),
the backup low-voltage power source is housed in a backup low-voltage power source case (26, 27), and
neither the main nor the backup low-voltage power source case is watertight.

According to (9), neither the main nor the backup low-voltage power source case is watertight, manufacturing costs for the main and the backup low-voltage power source cases can be reduced.

The invention claimed is:
1. A vehicle, comprising:
a rotating electrical machine configured to drive the vehicle;
a high-voltage power source configured to supply electricity for driving the rotating electrical machine;

a main low-voltage power configured to supply electricity whose output voltage is lower than an output voltage of the high-voltage power source;
a normal load configured to operate on the electricity supplied from the main low-voltage power source;
a backup low-voltage power source configured to supply electricity whose output voltage is lower than that of the high-voltage power source;
a critical load configured to operate on the electricity supplied from the backup low-voltage power source; and
a floor panel that extends in a vehicle length direction and a vehicle width direction and is configured to constitute a lower part of a vehicle body at least in part, wherein the critical load includes:
   an auxiliary load for controlling the vehicle;
   an auxiliary load for braking the vehicle;
   an auxiliary load for steering the vehicle; or
   an auxiliary load for acquiring external information of the vehicle,
a central tunnel that is convex upward and extends in a central part of the vehicle in the vehicle width direction along the vehicle length direction is formed in the floor panel,
one of the main and the backup low-voltage power sources is placed right above the floor panel and to one side of the central tunnel in the vehicle width direction, and
the other one of the main and the backup low-voltage power sources is placed right above the floor panel and to the other side of the central tunnel in the vehicle width direction.

2. The vehicle according to claim 1, further comprising:
a first seat placed right above the floor panel and to the one side of the central tunnel in the vehicle width direction; and
a second seat placed right the floor panel and to the other side of the central tunnel in the vehicle width direction, wherein
the one of the main and the backup low-voltage power sources is placed below the first seat, and
the other one of the main low and the backup low-voltage power sources is placed below the second seat.

3. The vehicle according to claim 2, wherein
the of the main and the backup low-voltage power sources overlaps with the first seat as viewed from a vehicle height direction,
the other one of the main and the backup low-voltage power sources overlaps with the second seat as viewed from the vehicle height direction, and
the main and the backup low-voltage power sources have substantially the same dimensions in the vehicle width and the vehicle length directions.

4. The vehicle according to claim 1, wherein
the main and the backup low-voltage power sources are placed at different positions in the vehicle height direction.

5. The vehicle according to claim 1, wherein
the main low-voltage power source is housed in a main low-voltage power source case,
the backup low-voltage power source is housed in a backup low-voltage power source case, and
neither the main nor the backup low-voltage power source case is watertight.

6. A vehicle, comprising:
a rotating electrical machine configured to drive the vehicle;
a high-voltage power source configured to supply electricity for driving the rotating electrical machine;
a main low-voltage power source configured to supply electricity whose output voltage is lower than an output voltage of the high-voltage power source;
a normal load configured to operate on the electricity supplied from the main low-voltage power source;
a backup low-voltage power source configured to supply electricity whose output voltage is lower than that of the high-voltage power source;
a critical load configured to operate on the electricity supplied from the backup low-voltage power source; and
a floor panel that extends in a vehicle length direction and a vehicle width direction and is configured to constitute a lower part of a vehicle body at least in part, wherein
the critical load includes:
   an auxiliary load for controlling the vehicle;
   an auxiliary load for braking the vehicle;
   an auxiliary load for steering the vehicle; or
   an auxiliary load for acquiring external information of the vehicle,
the floor panel includes:
   a front floor panel that extends in the vehicle length and the vehicle width directions and is configured to constitute a floor of a passenger compartment;
   and a rear floor panel that extends in the vehicle length and the vehicle width directions behind and above the front floor panel and is configured to constitute a floor of a luggage compartment provided behind the passenger compartment,
one of the main and the backup low-voltage power sources is placed right above the front floor panel, and
the other one of the main and the backup low-voltage power sources is placed right above the rear floor panel.

7. The vehicle according to claim 6, further comprising:
a first seat placed right above the front floor panel and to one side of a center of the vehicle in the vehicle width direction; and
a second seat placed right above the front floor panel and to the other side of the center of the vehicle in the vehicle width direction, wherein
one of the main and the backup low-voltage power sources is placed below the first seat, and
the other one of the main and the backup low-voltage power sources is placed to the other side of the center of the vehicle in the vehicle width direction.

8. The vehicle according to claim 6, wherein
the main low-voltage power source is housed in a main low-voltage power source case,
the backup low-voltage power source is housed in a backup low-voltage power source case, and
neither the main nor the backup low-voltage power source case is watertight.

9. A vehicle, comprising:
a rotating electrical machine configured to drive the vehicle;
a high-voltage power source configured to supply electricity for driving the electrical rotating machine;
a main low-voltage power source configured to supply electricity whose output voltage is lower than an output voltage of the high-voltage power source;
a normal load configured to operate on the electricity supplied from the main low-voltage power source;
a backup low-voltage power source configured to supply electricity whose output voltage is lower than that of the high-voltage power source;

a critical load configured to operate on the electricity supplied from the backup low-voltage power source; and a floor panel that extends in a vehicle length direction and a vehicle width direction and is configured to constitute a lower part of a vehicle body at least in part, wherein the critical load includes:
- an auxiliary load for controlling the vehicle;
- an auxiliary load for braking the vehicle;
- an auxiliary load for steering the vehicle; or
- an auxiliary load for acquiring external information of the vehicle, the floor panel includes:
- a front floor panel that extends in the vehicle length and the vehicle width directions and is configured to constitute a floor of a passenger compartment; and
- a rear floor panel that extends in vehicle length and the vehicle width directions behind and above the front floor panel and is configured to constitute a floor of a luggage compartment provided behind the passenger compartment, one of the main and the backup low-voltage power sources is placed right above the rear floor panel and to one side of a center of the vehicle in the vehicle width direction, the other one of the main and the backup low-voltage power sources is placed right above the rear floor panel and to the other side of the center of the vehicle in the vehicle width direction, and the main and the backup low-voltage power sources are separated from each other by the center of the vehicle in the vehicle width direction such that an offset distance in the vehicle width direction between the center of the vehicle and the main low-voltage power source is equal to an offset distance in the vehicle width direction between the center of the vehicle and the backup low-voltage power source.

10. The vehicle according to claim 9, wherein
each end of the rear floor panel in the vehicle width direction is provided with a rear wheel well, and
each of the main and the backup low-voltage power sources is closer to the center of the vehicle in the vehicle width direction than the rear wheel well and overlaps with the rear wheel well as viewed from the vehicle width direction.

11. The vehicle according to claim 9, wherein
the main low-voltage power source is housed in a main low-voltage power source case,
the backup low-voltage power source is housed in a backup low-voltage power source case, and
neither the main nor the backup low-voltage power source case is watertight.

* * * * *